(12) United States Patent
Fujioka et al.

(10) Patent No.: US 10,614,139 B2
(45) Date of Patent: Apr. 7, 2020

(54) SYSTEM AND METHOD FOR PROVIDING CURATED CONTENT ITEMS

(71) Applicant: Mattel, Inc., El Segundo, CA (US)

(72) Inventors: Robb Fujioka, Manhattan Beach, CA (US); Douglas Quon Woo, Hermosa Beach, CA (US); Chiyu He, San Jose, CA (US)

(73) Assignee: Mattel, Inc., El Segundo, CA (US)

( * ) Notice: Subject to any disclaimer, the term of this patent is extended or adjusted under 35 U.S.C. 154(b) by 521 days.

(21) Appl. No.: 14/829,393

(22) Filed: Aug. 18, 2015

(65) Prior Publication Data

US 2016/0050446 A1 Feb. 18, 2016

Related U.S. Application Data

(60) Provisional application No. 62/038,772, filed on Aug. 18, 2014.

(51) Int. Cl.
*G06F 16/9535* (2019.01)
*G06F 16/245* (2019.01)
(Continued)

(52) U.S. Cl.
CPC ........ *G06F 16/9535* (2019.01); *A63F 13/792* (2014.09); *G06F 16/245* (2019.01);
(Continued)

(58) Field of Classification Search
CPC ........... H04N 21/4627; H04N 21/8355; H04N 21/2543; H04N 21/26258; H04N 21/44204; H04N 1/00408
See application file for complete search history.

(56) References Cited

U.S. PATENT DOCUMENTS

2002/0036658 A1  3/2002  Carolan et al.
2005/0262204 A1* 11/2005  Szeto ............... G06Q 30/06
                                                         709/206
(Continued)

FOREIGN PATENT DOCUMENTS

CN          100555278 C    10/2009

OTHER PUBLICATIONS

PCT International Search Report dated Nov. 24, 2015 in corresponding PCT Application No. PCT/US2015/045746 filed Aug. 18, 2015, inventor Robb Fujioka.
(Continued)

*Primary Examiner* — Brian T Pendleton
(74) *Attorney, Agent, or Firm* — Edell, Shapiro & Finnan, LLC

(57) ABSTRACT

A system and method for providing curated content items is disclosed. According to one embodiment, a method includes selecting a first set of content items from a plurality of available content items provided by a plurality of content provider servers, providing the first set of content items to a second user account included in a subscriber account, the subscriber account including a first user account and the second user account, providing a curation interface to the second user account on a second user portal that displays on a user device, the curation interface displaying information on the first set of content items, receiving a curation instruction that is configured by the second user account via the curation interface, selecting a second set of content items from the first set of content items based upon the curation instruction, and providing the second set of content items to the first user account on a first user portal that displays on the user device.

24 Claims, 20 Drawing Sheets

(51) Int. Cl.

| | | |
|---|---|---|
| *G06F 16/248* | (2019.01) | |
| *G06F 16/955* | (2019.01) | |
| *H04L 29/06* | (2006.01) | |
| *H04N 21/466* | (2011.01) | |
| *H04N 21/258* | (2011.01) | |
| *H04N 21/2665* | (2011.01) | |
| *H04N 21/2668* | (2011.01) | |
| *H04N 21/442* | (2011.01) | |
| *A63F 13/792* | (2014.01) | |
| *G06Q 30/06* | (2012.01) | |
| *H04N 21/25* | (2011.01) | |

(52) U.S. Cl.
CPC ......... *G06F 16/248* (2019.01); *G06F 16/955* (2019.01); *G06Q 30/0625* (2013.01); *G06Q 30/0631* (2013.01); *H04L 65/4023* (2013.01); *H04L 65/4084* (2013.01); *H04N 21/252* (2013.01); *H04N 21/25883* (2013.01); *H04N 21/25891* (2013.01); *H04N 21/2665* (2013.01); *H04N 21/2668* (2013.01); *H04N 21/44222* (2013.01); *H04N 21/4661* (2013.01); *H04N 21/4667* (2013.01); *H04N 21/4668* (2013.01)

(56) References Cited

U.S. PATENT DOCUMENTS

| | | |
|---|---|---|
| 2007/0067215 A1 | 3/2007 | Agarwal et al. |
| 2008/0163307 A1 | 7/2008 | Coburn et al. |
| 2009/0119590 A1 | 5/2009 | Kondziela et al. |
| 2011/0225417 A1* | 9/2011 | Maharajh ............... G06F 21/10 713/150 |
| 2013/0124371 A1 | 5/2013 | Mehta et al. |
| 2013/0212091 A1 | 8/2013 | Hoffman et al. |
| 2013/0231999 A1 | 9/2013 | Emrich et al. |
| 2014/0025502 A1 | 1/2014 | Ramer et al. |
| 2014/0075583 A1 | 3/2014 | Martin et al. |
| 2014/0215513 A1 | 7/2014 | Ramer et al. |

OTHER PUBLICATIONS

PCT International Search Report dated Nov. 24, 2015 in corresponding PCT Application No. PCT/US2015/045745 filed Aug. 18, 2015, inventor Robb Fujioka.

PCT International Search Report dated Nov. 24, 2015 in corresponding PCT Application No. PCT/US2015/045742 filed Aug. 18, 2015, inventor Robb Fujioka.

* cited by examiner

SYSTEM AND METHOD FOR PROVIDING CURATED CONTENT ITEMS

CROSS REFERENCE TO RELATED APPLICATIONS

The present disclosure claims the benefit of U.S. Provisional Patent Application No. 62/038,772 entitled "SYSTEM AND METHOD FOR PROVIDING CURATED CONTENT ITEMS" filed on Aug. 18, 2014 and is hereby incorporated by reference.

FIELD

The present disclosure generally relates to a mobile computer system, and more particularly, to a system and method for providing curated content items to users.

BACKGROUND

A traditional search-based content providing system provides a search result including various types of content items in response to a user's search keyword(s). The user's history of search keywords and interactions to past search results are used to narrow and refine the search results for providing more accurate search results. A search also provides customized results for the user based on the user's history of search.

A user of a content subscription service provider typically searches media content that is grouped by pre-determined categories, such as by media genre. Examples of media genre include "Action & Adventure," "Children & Family," "Comedy," "Documentary," "Foreign," "Drama," "Music & Musicals," "Horror," and "Sports & Fitness." Depending on the user's preferences and content consumption habits, content items of a certain category may be frequently consumed, however, other content items of other categories may not be consumed at all. The content subscription service provider may provide suggestions for content items based on the user's content consumption patterns.

However, traditional content subscription services provide access to large volumes of content items that are not conducive to discovery. These traditional content subscription services provide user interfaces that make it difficult for a user to discover content items or associated content items that are rewarding to the user. Furthermore, a user's content consumption habits may lead to a habituation or addiction to specific topics, subjects, or types of content items.

SUMMARY

A system and method for providing curated content items is disclosed. According to one embodiment, a method includes selecting a first set of content items from a plurality of available content items provided by a plurality of content provider servers, providing the first set of content items to a second user account included in a subscriber account, the subscriber account including a first user account and the second user account, providing a curation interface to the second user account on a second user portal that displays on a user device, the curation interface displaying information on the first set of content items, receiving a curation instruction that is configured by the second user account via the curation interface, selecting a second set of content items from the first set of content items based upon the curation instruction, and providing the second set of content items to the first user account on a first user portal that displays on the user device.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The accompanying drawings, which are included as part of the present specification, illustrate the various embodiments of the present disclosed system and method and together with the general description given above and the detailed description of the preferred embodiment given below serve to explain and teach the principles of the present disclosure.

Figure 1:
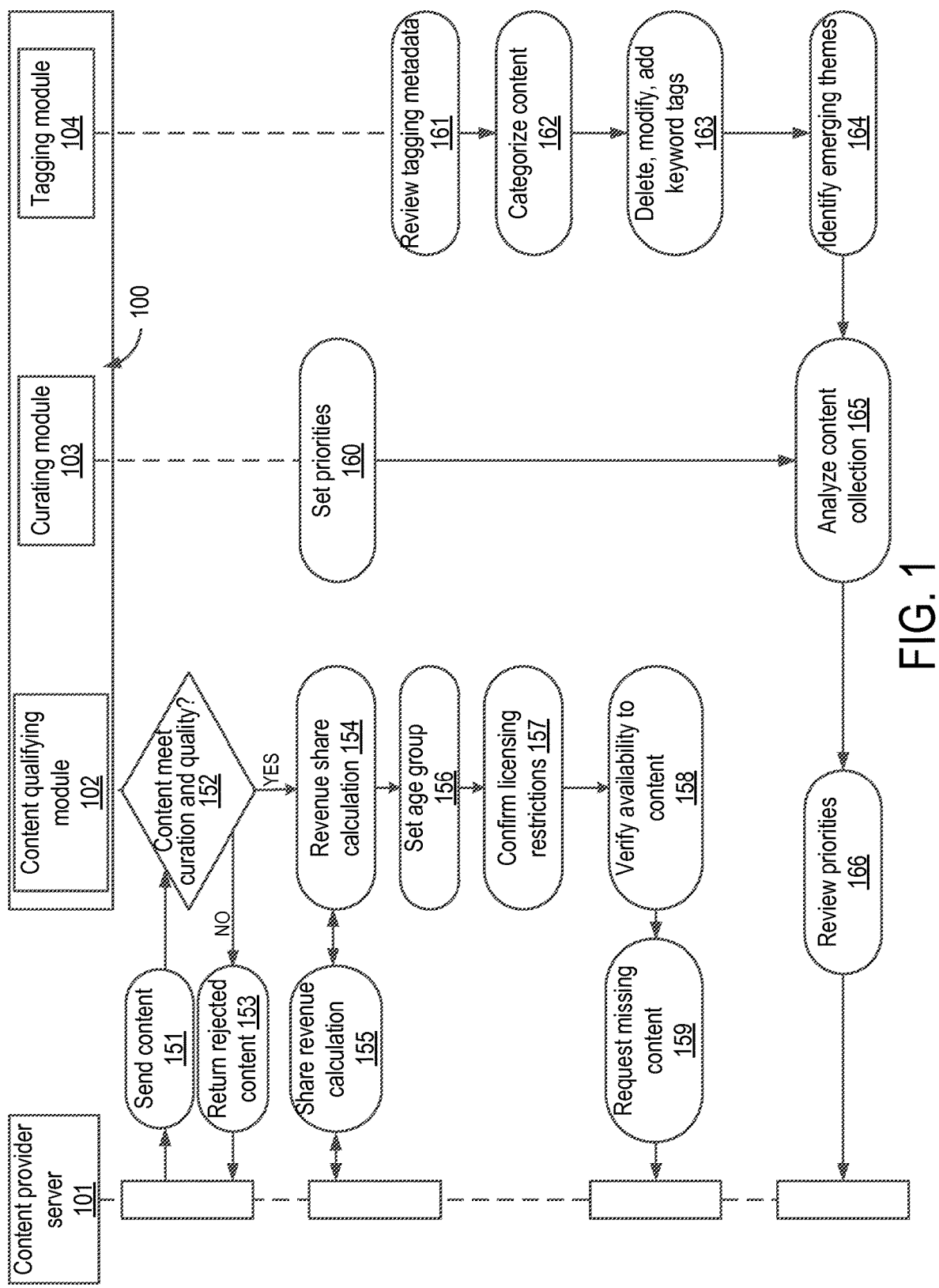
FIG. 1 illustrates an exemplary flow chart for content qualification and priority tagging, according to one embodiment.

It should be noted that the figures are not necessarily drawn to scale and that elements of structures or functions are generally represented by reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

A system and method for providing curated content items is disclosed. According to one embodiment, a method includes selecting a first set of content items from a plurality of available content items provided by a plurality of content provider servers, providing the first set of content items to a first user account of a plurality of first user accounts on a first user portal that displays on a user device, each of the first user accounts associated with a respective subscriber account of a plurality of subscriber accounts, receiving consumption information for each of the plurality of first user accounts regarding the first set of content items from the user device, determining limited content curation analytics regarding the plurality of available content items, selecting a second set of content items for the plurality of first user accounts from the plurality of available content items based on the limited content curation analytics and the consumption information, and providing the second set of content items to each of the plurality of first user accounts on the first user portal. According to one embodiment, the first set of content items and the second set of content items are selected from the plurality of available content items that are available at a time of selecting a respective first set of content items and a respective second set of content items. The plurality of available content items used for selecting the first set of content items and the plurality of available content items used for selecting the second set of content items, each refer to the plurality of content items that are available at the time of selection. These instances of plurality of available content items may or may not be the same.

In one embodiment, the limited content curation analytics include the consumption information for the plurality of first user accounts as input. The present content curation system may select the second set of content items from the plurality of available content items using curated content heuristics based on the limited content curation analytics.

In one embodiment, the present content curation system segments content items within the second set of content items and selects the second set of content items from the plurality of available content items using curated content heuristics based on balancing across segments of content items within the second set of content items. The present content curation system may provide a scheduled update of the segments of content items, where each of the segments of content items includes one of a genre, a theme, user tagged data, and a content type. The present content curation system may provide the scheduled update of the segments of content items based on varying one or more themes, wherein the theme is based on one of a season, an event, a character, a relation, and a geographical location. The segments of content items include a plurality of content types, where the plurality of content types includes two or more of broadcasted media content, a movie, a video, an audio file, a text file, an electronic book, and an application. The present content curation system may select the second set of content items from the plurality of available content items using the curated content heuristics based on limited time content curation analytics. The present content curation system may select the second set of content items from the plurality of available content items using the curated content heuristics based on one or more of collection analytics for the plurality of available content items, analytics of a plurality of segments of content items, analytics of popularity of content items, and associative content analytics.

In one embodiment, the present content curation system recommends one or more of a physical item and a virtual item associated with a content item of the first set of content items for purchase by the first user account on the user device, wherein the virtual item includes a movie, a video, an audio file, an electronic book, and an application. The present content curation system may provide payment to the plurality of content provider servers based on the consumption information. In one embodiment, the present content curation system receives an indication of consumption of a first content item of the first set of content items, and provides a second content item to the first user account based on the indication of consumption of the first content item, where the second content item has one of a similar topic to the first content item, a divergent topic from the first content item, and an associated topic with the first content item.

According to one embodiment, a method includes selecting a first set of content items of a limited content curation from a plurality of available content items provided by a plurality of content provider servers, providing the first set of content items to a first user account on a first user portal that displays on a user device, receiving consumption information for the first user account regarding the first set of content items from the user device, selecting a second set of content items for the first user account based on the consumption information for the first user account, and providing the second set of content items to the first user account on the first user portal.

In one embodiment, the present content curation system selects the first set of content items based on one or more of a demography associated with the first user account, a user preference associated with the first user account, a season, an event, a character, a relation, a geographical location, a desired content item provided by a content provider server of the plurality of content provider servers, and a promotional campaign provided by the content provider server.

In one embodiment, the present content curation system selects a second set of content items for the first user account based on the consumption information for the first user account including logging a history of the consumption information, and comparing the history of the consumption information with a predetermined criterion of the consumption information. The consumption information includes one or more of a completed task associated with a content item of the first set of content items, a cumulative consumption time of the content item of the first set of content items, a number of times of consumption of the content item, a frequency of consumption of the content item, and a number of content items of the first set content items that are consumed by the first user account.

In one embodiment, the present content curation system provides a discovery path for the first user account, where the discovery path includes a plurality of content items from the first set of content items of the limited content curation from the plurality of available content items. The present content curation system may monitor a completion progress of the discovery path based on the consumption information, and modify the discovery path based on the consumption information. In one embodiment, the present content curation system provides the first set of content items to the first user account on a first user interface that displays on the first user portal. The present content curation system further provides the second set of content items to the first user account on a second user interface that displays on the first user portal.

In one embodiment, the present content curation system provides the first set of content items to the first user account of a plurality of first user accounts, where each of the first user accounts is associated with a respective subscriber account of a plurality of subscriber accounts, receives the consumption information for the first user account for each of the plurality of first user accounts, selects the second set of content items for the plurality of first user accounts based on the consumption information for each of the plurality of first user accounts, and provides the second set of content items on the first user portal to each of the plurality of first user accounts. The present content curation system may select the second set of content items for the plurality of first user accounts is based on limited content curation analytics regarding the consumption information for each of the plurality of first user accounts. The second set of content items for the plurality of first user accounts may be selected from the plurality of available content items.

In one embodiment, the present content curation system receives a curation instruction that is configured by a second user account on a second user portal that displays on the user device, where the second set of content items for the first user account is selected based on the consumption information for the first user account and the curation instruction. The curation instruction may include a desired triggering event including a predetermined status of the consumption information for the first user account. The curation instruction may include one or more of a completed task associated with one or more content items of the first set of content items, a threshold consumption time of the one or more content items, a threshold number of times of consumption of the one or more content items, a threshold frequency of consumption of the one or more content items, and a threshold number of content items of the first set of content items that are consumed by the first user account. The first user account and the second user account may be associated with a common subscription account.

According to one embodiment, the present system and method includes selecting a first set of content items from a plurality of available content items provided by a plurality of content provider servers, providing the first set of content items to a second user account included in a subscriber account, wherein the subscriber account includes a first user account and the second user account, providing a curation interface to the second user account on a second user portal that displays on a user device, wherein the curation interface displays information on the first set of content items, receiving a curation instruction that is configured by the second user account via the curation interface, selecting a second set of content items from the first set of content items based upon the curation instruction, and providing the second set of content items to the first user account on a first user portal that displays on the user device. The first user account may include a first user identification, and the second user account may include a second user identification.

In one embodiment, the information on the first set of content items includes a discovery path including content items from the first set of content items selected by the second user account of the subscription account. In one embodiment, the present content curation system provides the curation instruction to a plurality of subscriber accounts upon authorization by the second user identification via the curation interface. In another embodiment, the present content curation system receives consumption information for the first user account regarding the second set of content items from the user device, and provides the consumption information for the first user account to the plurality of subscriber accounts. This allows the second user account by a parent, for example, to share his/her curation experience with other parent subscribers.

In one embodiment, the present content curation system compiles a playlist from the second set of content items based on the consumption information for the first user account regarding the second set of content items. The playlist may be configured by the first user account using the first user portal that displays on the user device. The content curation system may provide the playlist to a plurality of subscriber accounts upon authorization by the first user account.

In one embodiment, the present content curation system provides the consumption information for the first user account to the plurality of content provider servers. The present content curation system may provide payment to the plurality of content provider servers based on the consumption information. In one embodiment, the present content curation system associates the subscriber account with a subscription service mode that is selected by the second user account via the second user portal, and selects the first set of content items from the plurality of available content items provided by the plurality of content provider servers based on the subscription service mode.

According to one embodiment, the present system and method includes selecting curated content items based on one or more of an age, an interest, a subject, and a proficiency level of a user, receiving a search request from the user for a first content item from the curated content items, and providing the first content item to the user. The user may have a subscription service with one or more of a third party operating system and an application store, wherein the subscription service is for one or more of an application and a game. The present content curation system may provide the first content item to the user via cloud delivery. The present content curation system may provide cloud back up play of the first content item and allow the user to download the first content item.

In one embodiment, the present content curation system provides a conversion to purchase a second content item based on historical consumption of one or more curated content items. The present content curation system may provide a playlist of one or more curated content items. The present content curation system may provide a free offer of one or more curated content items. The present content curation system may integrate the curated content items into a primary screen.

In one embodiment, the present content curation system provides a queue list for one or more curated content items. The present content curation system may provide a trial version of one or more curated content items and further provide a conversion to purchase the one or more curated content items based on the trial version.

In the following description, for purposes of clarity and conciseness of the description, not all of the numerous components shown in the schematic are described. The numerous components are shown in the drawings to provide a person of ordinary skill in the art a thorough enabling disclosure of the present system and method. The operation of many of the components would be understood to one skilled in the art.

Each of the additional features and teachings disclosed herein can be utilized separately or in conjunction with other features and teachings to provide a system and method for providing curated content. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the present disclosure. Therefore, combinations of features disclosed in the following detailed description may not be necessary to practice the teachings in the broadest sense and are instead taught merely to describe particularly representative examples of the present teachings.

Moreover, various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced but are not intended to limit the dimensions and the shapes shown in the examples.

According to one embodiment, the present mobile computer system and applications running on the present mobile computer system is designed for children. Children may learn, study, and draw on the present mobile computer using a touch-sensitive screen or a pen. The present mobile computer system provides a user experience that is specifically tailored for a target age group by providing characters, animations, video tutorials, and interactive lessons. An application running on the present mobile computer system may include an integrated parental control.

According to one embodiment, the present mobile computer system provides an environment for children to learn how to use and behave on a social networking platform that is managed and monitored by parents. Each child on the social networking platform has a unique identification (ID) and connects with trusted family members to share their creations, activities, and photos through email, instant messenger (IM), and photo sharing.

In the following description, numerous specific details are set forth in order to provide a thorough understanding of the present disclosure. It will be apparent, however, to one of ordinary skill in the art that the present disclosure may be practiced without these specific details. In other instances, well known components or methods have not been described in detail but rather in a block diagram, or a schematic, in order to avoid unnecessarily obscuring the present disclosure. Further specific numeric references such as "first component," may be made. However, the specific numeric reference should not be interpreted as a literal sequential order but rather interpreted that the "first component" is different from a "second component." Thus, the specific details set forth are merely exemplary. The specific details may be varied from and still be contemplated to be within the spirit and scope of the present disclosure. The term "coupled" is defined as meaning connected either directly to the component or indirectly to the component through another component.

Curation Process

The present disclosure relates to a content curation system and method for providing curated content items to users. According to one embodiment, a curated content provider provides curated content items to a user by selecting a limited number of content items from a plurality of available content items. The available content items may be provided by other content provider servers, content publishing servers, and/or content distributor servers. The present content curation system provides a first limited number of content items from the plurality of available content items to a first user (e.g., a child) based on a curation process that encourages varied content consumption. The present content curation system further selects a second limited number of content items from the plurality of available content items that is approved by a second user (e.g., a parent). The first user may be referred to as a discovery user. The second user may be referred to as a control user. This provides well-balanced content consumption for the discovery user.

According to one embodiment, the present content curation system includes a variety of features including, but not limited to, an overlay system architecture, a customizable and granular parental controls, a curated application store, an electronic commerce interface, multiple profile management capabilities, kid-safe browsing, dual mode access controls, tracked user activity in a discovery user mode, and an adaptive learning system. The present content curation system further recommends content items based on content popularity and past test results.

According to one embodiment, the present content curation system curates content items by providing a limited number of content items of a primary topic from a plurality of available content items to a discovery user. The discovery user may indicate an interest in the curated content items by consuming one or more of the curated content items. In addition, the discovery user may indicate an interest in the curated content items via social networking features of the present content curation system, such as a shared play list feature that enables a discovery user to share a play list of content items with other subscribers of the present content curation system. The present content curation system further selects content items of a secondary topic that is related to the primary topic based on user interest and user consumption of the limited number of content items of the primary topic. For example, a discovery user indicates an interest in cars by consuming content items concerning a primary topic of cars. The present content curation system analyzes the user's interest in cars and provides content items of a secondary topic that is related to the primary topic of cars, including, but not limited to, car design, engines, electric cars, air pollution, and resource management.

According to one embodiment, the present content curation system curates content items by providing a limited number of content items from a plurality of available content items, where the limited number of content items is of a similar topic to a content item that was previously consumed by a discovery user. The present content curation system provides content items of a topic that helps a discovery user to broaden his/her interest while controlling the number of content items on a specific topic to encourage the discovery user to explore other topics.

According to one embodiment, the present content curation system curates content items by providing a limited number of content items from a plurality of available content items, where the limited number of content items is of a divergent topic from a content item that was previously consumed by a discovery user. This encourages the discovery user to consume a content item with a divergent topic from a prior consumed content item of primary interest to the discovery user, thus broadening awareness and piquing the curiosity of the discovery user. The present content curation system may provide a content item with a topic that is divergent from a discovery user's interest and consumption information of curated content items based on topics that are configured by a control user (e.g., a parent). For example, based on a consumption information of a discovery user indicating a strong aptitude and interest in content items of a first theme, the present content curation system provides the discovery user (e.g., a child) with content items of a second theme that is associated with a development goal configured by a control user (e.g., a parent) and/or a curator. By providing content items of divergent topics, the present content consumption system encourages a user to explore balanced and varied content discovery.

According to one embodiment, the present content curation system provides limited content curation by selecting a limited number of content items from a plurality of available content items, and further selecting a type of content item. The present content curation system provides a user with a limited number of content items that may be segmented based on various factors, including, but not limited to, a content type, a genre, a topic, a theme, and user tagged data. The content type includes, but is not limited to, a movie, a video, an application, an electronic book, an audio file, a game, and an article. The present content curation system allows the discovery user to select and consume one or more content items from the limited number of content items of primary interest to the discovery user. After the discovery user consumes content items that are of primary interest, the present content curation system provides the discovery user with content items based on other factors, such as a content type, a genre, a topic, and a theme. For example, the present content curation system recommends a game related to a movie after a discovery user consumes the movie content item to provide a multi-media experience. Limited content curation provides discovery users with a wide range of diverse topics and content types while offering entertainment and educational benefits.

According to one embodiment, the present content curation system provides a content item that is associated with a curated content item to a discovery user by analyzing his/her discovery experience history including consumption information of the curated content item. The present content curation system recommends a content item that is associated with a curated content item where the recommended content item may be referred to as an associative content item. The present content curation system provides a limited menu, a set of links, or visual presentation of content item icons or badges, to allow a user to discover an associative content item. The present content curation system provides an associative content item based on the consumption information of a curated content item for the discovery user, and predetermined information determined by a system curator or a control user (e.g., a parent). The consumption information includes, but is not limited to, a completed task associated with the curated content item, a cumulative consumption time of the curated content item, a number of times of consumption of the curated content item, a frequency of consumption of the curated content item, and a number of curated content items that are consumed. The predetermined information may correspond to undesirable content consumption information of the discovery user, such as an excessive number of times or frequency of consumption of a given content item, indicating a pattern of habituated or addictive consumption. The predetermined information may also correspond to desirable content consumption information of the discovery user, such as consuming a set of related content items within a limited curation time period, and may be used to reward the discovery user for achieving a discovery goal or to encourage the discovery user to pursue further discovery. The present content curation system may further determine an associative content item based on one or more additional conditions, for example, a metadata tag of a content item, an option based on a type of user device (e.g., a tablet computer, a desktop computer, and a mobile device), and an amount of available space on the user device.

According to one embodiment, the present content curation system extracts content items from a library of available content items. The available content items may be stored in a database of the content curation system or extracted from other content provider servers (e.g., DIRECTTV™) that maintain a respective subscription service with the present content curation system. The present content curation system analyzes, categorizes, and stores the extracted content items in the database with metadata tags. The present content curation system provides the extracted content items to a discovery user based on the discovery user's demography (e.g., age, gender), user preference, and consumption information.

A plurality of content provider servers may provide respective user subscription services to a discovery user/control user. According to one embodiment, a discovery user/control user maintains a first user subscription service with an electronic book content provider server and a second user subscription service with a movie content provider server. The present content curation system receives information from the first user subscription service and the second user subscription service to provide a trans-media experience to the discovery user. For example, if a discovery user watches a "Frozen" movie based on his/her first user subscription service with the movie content provider server, the present content curation system recommends a "Frozen" electronic book to the discovery user based on his/her second user subscription service with the electronic book content provider server.

According to one embodiment, the present content curation system organizes and tags each curated content item with a theme to encourage a discovery user (e.g., a child) to discover content items that relate to a theme of interest. The present content curation system varies a theme depending on various factors including, but not limited to, a season, an event, a character, a relation, and a user location. A theme provides an enriched user experience, entertainment, education, and skill development for the discovery user.

According to one embodiment, the present content curation system provides a plurality of themes to facilitate a discovery user's content discovery. The themes encompass educational and developmental values for a discovery user to play, learn, and grow from the content items. The present content curation system may tag higher priorities to themes to promote a higher probability of recurrence over a limited curation time period. Examples of themes include, but are not limited to "Friends and Family", "Around the World", "The Nature of Nature", "Animals", "Scoop, News, Non-fiction", "Inside Outer Space", "Fantasy", "Creativity", and "The Age of Dinosaurs".

According to one embodiment, the present content curation system organizes and tags each curated content item with a content type (e.g., a movie, a video, an audio, and an electronic book) to provide a trans-media user experience and facilitate a user to discover an associated or a related content item that may be of a different content type. The present content curation system dynamically integrates content items of different content types or media types to allow a user to make a contextual purchase of content items that are available for purchase. The present content curation system includes a user interface that has features such as a theme and a character to facilitate a discovery of trans-media content items.

The present content curation system categorizes content items based on a content type (e.g., a video, music, an electronic book, and an application) and a file format (e.g., mpeg-3, mpeg-4, H. 263/4, epub, pdf, and apk). Each content item may be associated with different user discovery and search capabilities. For example, content items are discoverable or searchable by a content type, a title, a genre, an artist, an author, a category, an age, a demographic, and a studio. The present content curation system further allows a discovery user to purchase and download a curated content item through an application store, to stream a curated content item from an on-demand server, and/or to download a curated content item to a user device for an offline use. The present content curation system may provide a cloud delivery of a curated content item (e.g., an application, a game) to the discovery user. The present content curation system may further allow the discovery user to back up a progress stage of a curated content item (e.g., a playing level of a game). According to one embodiment, the present content curation system provides the discovery user with a trial version of a curated content item and further allows the discovery user to purchase the curated content item after the discovery user consumes the trial version.

The present content curation system provides one or more themes to identify and publish a discovery of related or associated content items in a common theme across multiple content types. A blend of content types provides different approaches to entertainment, education and personal growth, for example, an electronic book for reading, and an application for adaptive learning. The present content curation system provides trans-media narrative (or trans-media storytelling) techniques for each theme to deliver content across multiple platforms and formats. In trans-media production, content providers develop a particular subject matter, for example, a story based on multiple content types, and deliver content items related to the particular subject matter to the content distribution network. Trans-media narrative provides an educational or developmental tool that offers a different level of user engagement with multiple content types. According to one embodiment, the present content curation system provides themes with a higher priority than characters and places themes in a more prominent portion of the user interface than characters in a default setting and layout.

Themes provided by the present content curation system have various characteristics. Content items are prioritized based on a level of limited curation. According to one embodiment, themes have a hierarchical order and can be associated with one or more subsidiary categories. For example, the "Friends and family" theme has sub-categories of "Parents and siblings," and "Friends and neighbors." Themes may also be seasonal (e.g., Christmas, Thanksgiving, Halloween, and Independence Day), and curated content items that relate to seasonal events are provided to a discovery user based on a demography and geographical location of the discovery user. For example, the present content curation system provides content items with an Independence Day theme (that is celebrated in America) to a discovery user located in America but not to a discovery user in China.

According to one embodiment, the present content curation system tags a content item with multiple themes. For example, the present content curation system provides five content items 1-5 tagged with different themes A-E, i.e.; 1(A), 2(B), 3(C), 4(D), and 5(E). The content items also share a common theme S, science. The present content curation system may plan a discovery experience of science in a variety of ways, for example, 1(A,S), 2(B,S), 3(C,S), 4(D,S), 5(E,S).

According to one embodiment, the present content curation system monitors a discovery user's consumption information and provides content items with a different theme to the user after the discovery user consumes a threshold number of curated content items with one or more given themes based on user inputs from a control user. The present content curation system includes a custodial data manager that receives the user inputs, such as a suggestion and a request through a community portal. For example, the present content curation system receives user inputs from a control user (e.g., a parent) regarding the curation for a discovery user (e.g., a child). This helps to reinforce values as a part of a child's education, entertainment and development.

The present content curation system provides a limited number of curated content items to enable a discovery user to select content items and associative content items through discovery. The present content curation system continuously and dynamically feeds content items to a discovery user based on the discovery user's consumption of a current set of limited content items.

According to one embodiment, the present content curation system tags metadata to categorize content items. FIG. 1 illustrates an exemplary flow chart for content qualification and priority tagging, according to one embodiment. The present content curation system 100 includes a content qualifying module 102, a curating module 103, and a tagging module 104. The present content curation system 100 communicates with one or more content provider servers 101. In one embodiment, a content provider server 101 includes a content developer who is qualified by the content qualifying module 102. In another embodiment, the content provider server 101 includes a content publisher.

The content provider server 101 sends a collection of content items to the content qualifying module 102 according to a contract with the present content curation system 100 (at 151). The content qualifying module 102 determines whether the content items provided by the content provider server 101 meet curation and quality guidelines (at 152). Examples of curation and quality guidelines include, but are not limited to a desired age, and a national and state curriculum standard. The content qualifying module 102 returns the content items that fail to meet the curation and quality guidelines to the content provider server 101 (at 153). The content provider server 101 and the content qualifying module 102 confirm a revenue share model by setting a content type for revenue share calculations (at 154). The content qualifying module 102 shares the revenue calculation with the content provider server 101 (at 155). For example, the content qualifying module 102 determines that the content provider server 101 receives a percentage of revenue received from a plurality of discovery users based on a number of times of consumption of a content item by the plurality of discovery users. The content qualifying module 102 further determines a desired age group for curating the content items (at 156). The content qualifying module 102 determines whether licensing restrictions such as a territory and a date of intended use are applicable to the content items (at 157). For each content type, the content qualifying module 102 verifies that content items for servicing users are available (at 158) and requests missing content items from the content provider server 101 (at 159).

The curating module 103 curates the qualified content items and determines the content items to refresh for a subsequent refresh cycle. The curating module 103 sets a priority for tagging content items based on a need for a current month's curation (at 160). The tagging module 104 reviews tagging metadata provided by the content provider server 101 (at 161) and categorizes the content items using the tagging metadata based on current themes and characters for preparing curation (at 162). The tagging module 104 deletes, modifies, and adds keyword tags based on a report from a reporting group, for example, a parental report (at 163). Based on the report from the reporting group, the tagging module 104 may identify an emerging theme based on users' keyword trends and send a suggestion for a new theme to the curating module 103 (at 164). The curating module 103 analyzes the content collection based on the suggestion from the tagging module 104 (at 165) and communicates with the content provider server 101 to review and recursively discuss priorities for the content collection (at 166).

Figure 2:
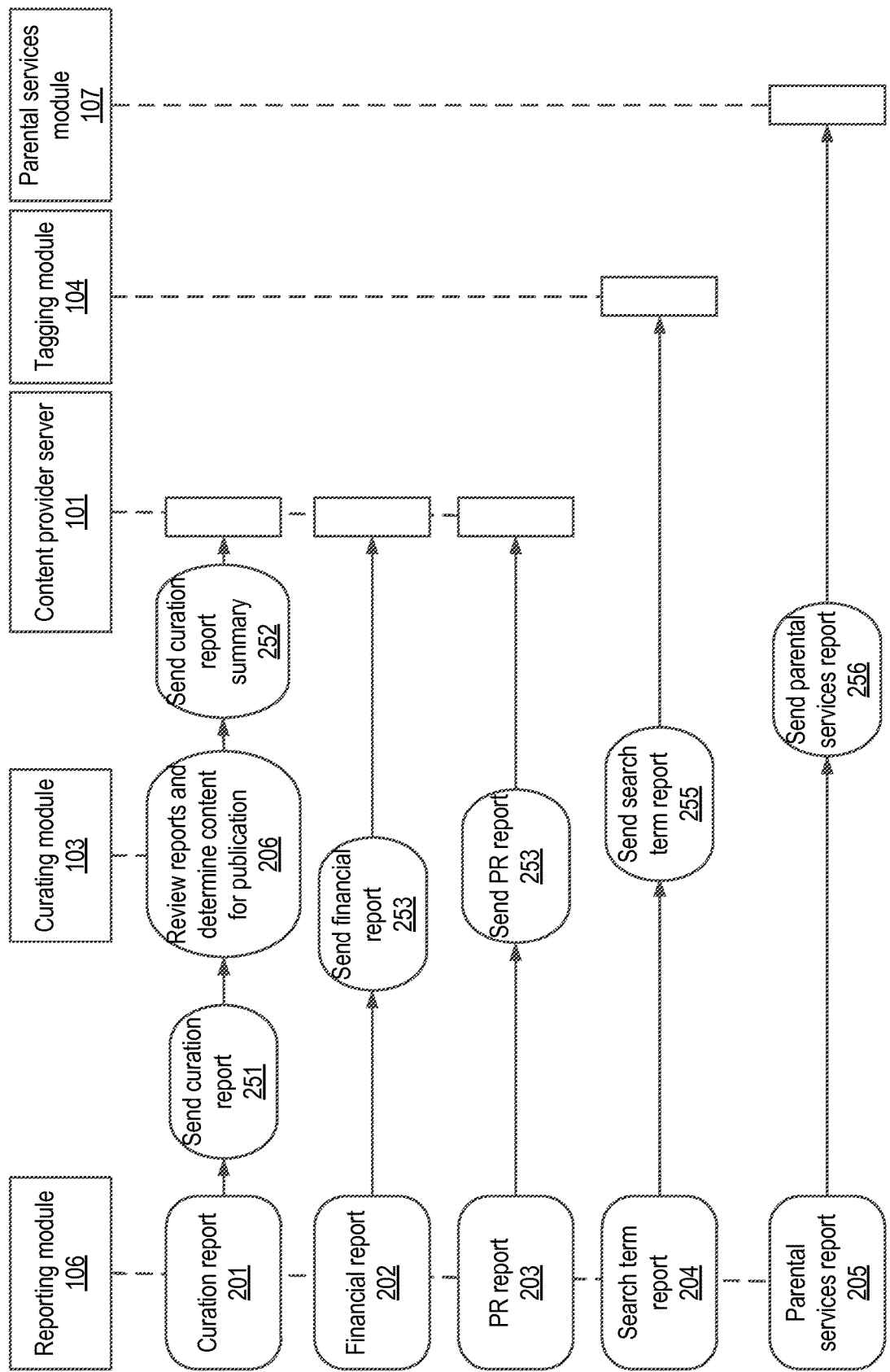
FIG. 2 illustrates an exemplary flow chart for producing reports, according to one embodiment.

FIG. 2 illustrates an exemplary flow chart for producing reports, according to one embodiment. The present content curation system further includes a reporting module 106 and parental services module 107. The reporting module 106 produces various reports including a curation report 201, a financial report 202, a public relations (PR) report 203, a search term report 204, and a parental services report 205. The curation report 201 indicates the popularity of content items within the demographic groups by various factors including a content type, a content provider, a theme, and a character. The curation report 201 may sort the popularity of content items based on a gender and an age group. The curation report 201 also includes information for subscription growth and user retention. The curation report 201 may further provide information that determine a reason for the popularity of a content item, for example, a location of a banner on a user interface, a genre, and a theme. The reporting group 106 forwards the curation report 201 to the curating module 103 (at 251). The curating module 103 receives and reviews the curation reports 201 from previous curation periods and determines content items to publish in a subsequent curation period (at 206). The curating module 103 forwards a summary of the curation report 201 to the content provider server 101 to provide feedback on the popularity and desirability of content items (at 252). According to one embodiment, the curating module 103 provides a web interface, for example, a dashboard, that includes the summary of the curation report 201 to the content provider server 101.

The financial report 202 includes information for a revenue share model with the content provider 101. The revenue share model is based on content usage and consumption per curation period. The reporting module 106 sends the financial report 202 to the content provider server 101 (at 253). The PR report 203 may be reformatted for external use by a PR company. The reporting group 106 sends the PR report 203 to the content provider server 101 (at 254). The PR report 203 may be used to influence qualified content providers and other non-qualified content providers. The search term report 204 includes statistical data for popular search terms and tags. The reporting module 106 sends the search term report 204 to the tagging module 104 to feed recommendations for tagging the content items (at 255). The parental services report 205 focuses on a consumption time on a specific theme by a discovery user. A control user may monitor the progress and activities of the discovery user and intervene as necessary. The parental services report 205 provides timely associated materials to encourage interaction between the control user and the discovery user and/or to enable the control user to monitor and control the content items to which the discovery user has access. The control user may review the content consumption behavior of the discovery user and purchase a content item or a related item for a birthday or rewards for good behaviors. The reporting module 106 forwards the parental services report 205 to the parental services module 107 to provide parenting tips and advertisements for related items for sale (at 256).

The present content curation system provides limited content curation to encourage a discovery user to navigate through the curated offering of content items and to facilitate discovery of content items by the discovery user. For example, a child user may not know what he/she wants to do with his/her device, and are often unaware of fun and beneficial opportunities. The present content curation system provides an informed judgment to discern appropriate alternatives to a discovery user. The present content curation system promotes a continuing and dynamic discovery process that strengthens a discovery user's engagement with content items offered on his/her device, and stimulates future use of his/her device. The curation process provides a quantity of different content types, levels and subject matters of user experiences to captivate and activate discovery users.

Figure 3:
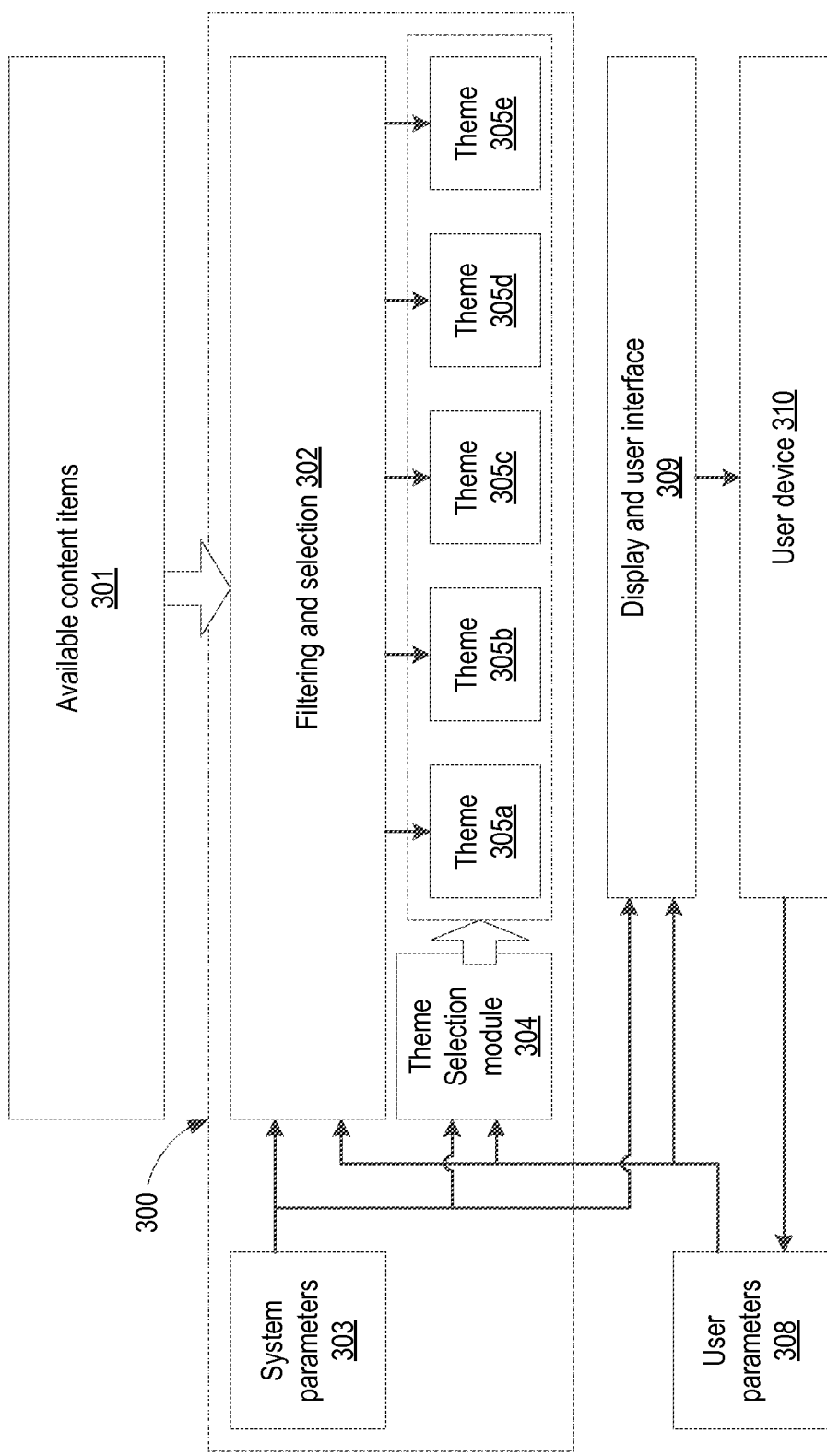
FIG. 3 illustrates an exemplary process for content curation, according to one embodiment.

FIG. 3 illustrates an exemplary process for content curation, according to one embodiment. A control user provides user parameters 308 to a user interface 309 of a user device 310. The user parameters 308 includes, but is not limited to, of a completed task associated with a content item, a threshold consumption time of the content item, a threshold number of times of consumption of the content item, a threshold frequency of consumption of the content item, and a number of content items that are consumed. The content curation system 300 stores system parameters 303 for a selection of content items for the user. The system parameters 303 includes, but is not limited to, a demography of a discovery user, a user preference associated with the discovery user, a season, an event, a character, a relation, a geographical location, a desired content item provided by a content provider server of the plurality of content provider servers, and a promotional campaign provided by the content provider server. The theme selection module 304 selects themes for the user based on the user parameters 308 and system parameters 303. Based on the selected themes 305*a*-305*e*, the content curation system filters and selects content items using a filtering and selection module 302 from available content items 301. The selected content items by the filtering and selection module 302 are displayed and made available for a discovery user via the user interface 309.

Curated Content Subscription Service

According to one embodiment, the present content curation system provides limited content curation by narrowing a number of content items that are available to a discovery user during a limited curation time period. Limited content curation facilitates a discovery user's discovery of content.

Limited content curation encourages the discovery user to discover content items in curated subject matters and topics and additional subject matters and topics that can help to broaden the development and the knowledge of the discovery user. Limited content curation provides a variety of content items specifically curated for the discovery user. For example, the present content curation system provides limited content curation by providing a limited number of content items from a plurality of available content items within a limited curation time period, measured in the number of content items and/or the length of time required to consume these content items, based on an expectation of the discovery user consuming these content items during the given time period. In addition, the present content curation system may notify the user of an expiration of a content item at the end of the limited curation time period to encourage the discovery user to consume the content item during the limited curation time period.

According to one embodiment, the present content curation system periodically publishes and updates curated content items to a discovery user. The present content curation system provides a curated content subscription service that authorizes a discovery user with a subscriber's pass to discover or consume the curated content items.

According to one embodiment, the present content curation system provides a user interface for providing a limited number of curated content items to a discovery user with a subscriber's pass. The present content curation system may provide the subscriber's pass to the discovery user for free or for a purchase price, for example, for a specified duration of time. The user interface for providing limited curation facilitates and encourages the discovery user's discovery of a variety of pre-selected content items from a plurality of available content items. Limited content curation encourages a discovery user to discover content items as opposed to receiving a search result that is provided by a search engine in response to the user's search request using a search criterion (e.g., a search keyword).

Figure 4:
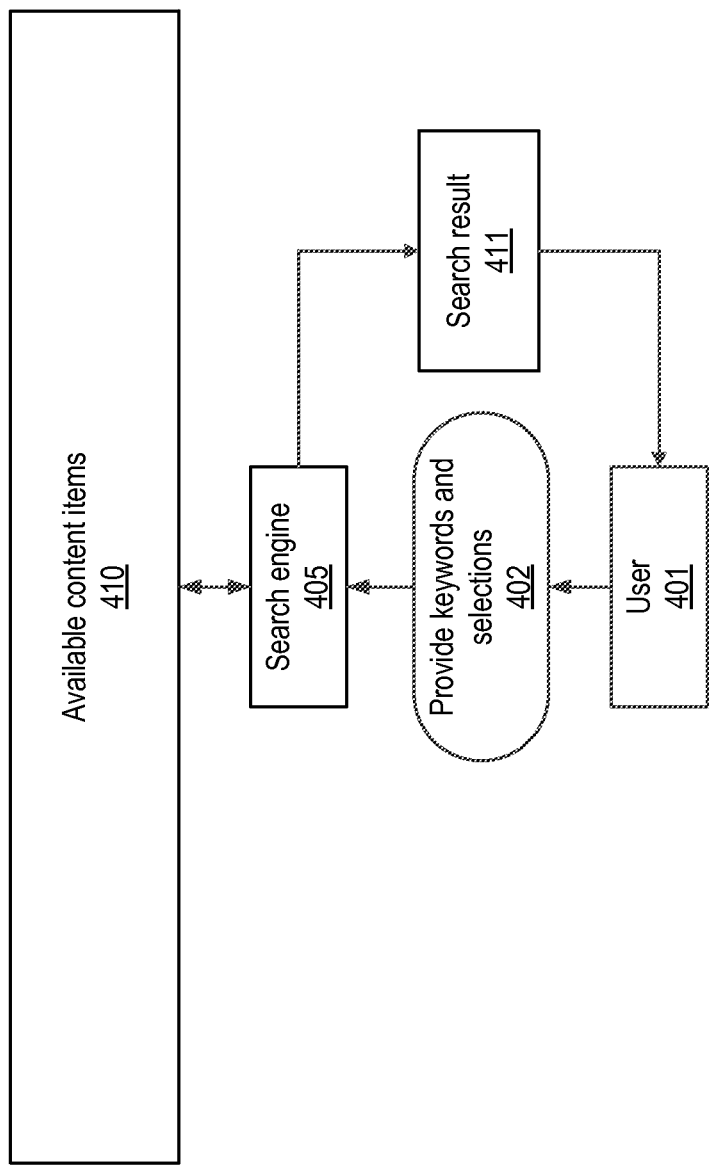
FIG. 4 illustrates an exemplary process of searching a content item, according to one embodiment.

FIG. 4 illustrates an exemplary process of searching a content item, according to one embodiment. A user 401 provides a keyword or a selection of a keyword to a search engine 405 (at 402). The search engine 405 indexes the user's selection of keywords and finds items that contain the keywords from a myriad of available content items 410 and returns the matching search results to the user 401 (at 411).

Figure 5:
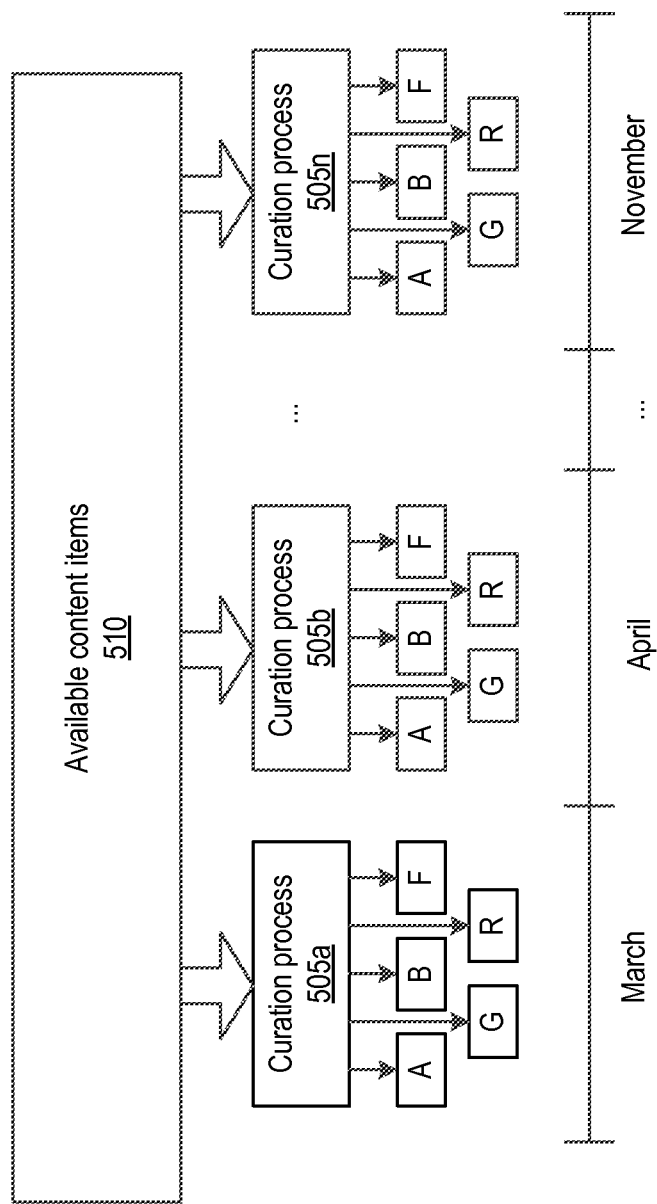
FIG. 5 illustrates an exemplary process of discovering a content item, according to one embodiment.

FIG. 5 illustrates an exemplary process of discovering a content item, according to one embodiment. A content curation system performs a plurality of content curation processes 505a-505n for a respective curation period (e.g., a month) from March to November. The content curation system provides a content curation process 505 that dynamically curates content items 510 based on system parameters and user parameters (as described earlier) and generates a limited number of content items for each theme A, B, F, G, and R. For each curation period, the content curation system selects and provides a new set of content items to the user.

The present content curation system facilitates and encourages a discovery of content items by a discovery user such as a child who requires supervision for content consumption. A search system is typically based on a user's knowledge of information for searching, and allows a user to seek a search result until he/she finds desired information. In contrast, the present content curation system and method provides content discovery when a discovery user is unsure what to look for, or when the discovery user is not looking for particular information. Content discovery allows a discovery user to uncover information that the discovery user may not be aware of, does not seek, or does not know whether he/she wanted the information. The present content curation system provides a tool to deliver and push information to the discovery user by providing a limited number of curated content items for a limited curation time period, and by periodically updating the curated content items after each limited curation time period.

According to one embodiment, the present content curation system provides a first number of content items from a plurality of available content items to a discovery user (e.g., a child). The user may consume one or more content items from the first set of content items based on his/her primary interest. Based upon the discovery user's consumption information of the first set of content items, the present content curation system provides a second number of content items from the plurality of available content items. The second number of content items may include content items that have not been consumed by the user so that the discovery user can explore new content items and topics that are beyond the discovery user's primary interest and consumption. In an embodiment, the first number of content items and the second number of content items each is selected from a limited curation of content items provided by the content curation system, based upon a curation instruction of a control user.

Content discovery benefits the discovery user's education and developments by presenting diversified content items and topics. Since the number of curated content items presented to the discovery user is limited, the discovery user is encouraged to explore and experience other content items that are of secondary interest after consuming content items of primary interest. During a limited time curation period, a discovery user may repeatedly consume or access a content item. The present content curation system determines when to restrict a discovery user from consuming a content item based on one or more of a completed task associated with a content item, a cumulative consumption time, a number of times of consumption of the content item, a frequency of consuming a content item, and a number of content items that are consumed. After restricting the discovery user from accessing the content item, the present content curation system provides the content item to the user again after the limited time curation period expires or after the discovery user consumes other content items. In an embodiment, restrictions on access to certain content items, and removal of restrictions, may be based upon curation instructions provided by a control user (e.g., a parent) associated with the discovery user (e.g., a child).

According to one embodiment, the present content curation system provides a curated content subscription service for a discovery user that receives and logs consumption information regarding the user's consumption of content items during a limited curation time period, and compiles one or more predetermined information regarding content consumption by the user. The present content curation system may further analyze the predetermined information to detect an occurrence of a triggering event. The curated content subscription service may be provided to multiple users, for example, a discovery user such as a child who requires supervision for content consumption and a control user such as a parent. The predetermined information may be established by the control user or a curating module of the present content curation system, and may be used to monitor and implement goals as to the discovery user's discovery of content, for example, to encourage balanced and varied discovery of content by the discovery user. The predetermined information may correspond to undesirable content consumption information of the discovery user, such as an excessive number of times or frequency of consumption of a given content item, indicating a pattern of habituated or addictive consumption. The predetermined information may also correspond to desirable content consumption information of the discovery user, such as consuming a set of related content items within a limited curation time period, and may be used to reward the discovery user for achieving a discovery goal or to encourage the discovery user to pursue further discovery.

According to one embodiment, the present content curation system provides limited time curation that includes a first curation time period within a second curation time period, where the first curation time period is shorter than the second curation time period. For example, the present content curation system provides games to a discovery user for a first curation time period (e.g., an afternoon, a weekend) during a second curation time period (e.g., a month). The present content curation system may curate an additional content item for discovery after the discovery user consumes one or more curated content items prior to the expiration of the second curation time period. The present content curation system removes a portion of content items from a collection of content items at a refresh point (e.g., at an end of the second curation time period) and adds/ substitutes new content items. At the refresh point, the present content curation system may also update elements of the user interface, such as a range and a placement of a theme, a featured theme, a character, and a trans-media content grouping.

In limited time curation, the content curation system publishes content items for a limited curation time period. For example, the present content curation system provides a set of content items on a monthly basis, and refreshes the set of content items at the end of each month. In another example involving non-periodic limited time curation, the limited curation time period is a fixed period of days before or after a certain date (e.g., starting 5 days before July $4^{th}$ and ending on July $4^{th}$). In one embodiment, the subscription service based on limited time curation does not allow a discovery user to save a published content item to a user device. Instead, the subscription service only allows the user to access the published content items during a limited curation time period.

Limited time curation complements discovery of content items. According to one embodiment, the present content curation system provides a theme and a character for each limited curation time period (e.g., one month). The present content curation system sets one or more tagging priorities and content categories to implement the theme and the character for each limited curation time period. Likewise, the present content curation system can change user interface elements such as a default setting, a layout of content items based on discovery objectives. Examples of discovery objectives include rules of relevancy, such as selecting content by an age group, a character, a category, or historical data of other discovery users within the same age group.

According to one embodiment, the present content curation system provides a curated content subscription service that provides curated content items that are specifically selected for a discovery user who subscribes to the curated content subscription service. In one embodiment, the present content curation system receives and analyzes information including parental inputs, and monitors and uses the information when determining content items to provide to a discovery user. The selection of content items, i.e., content curation, may be performed manually by a human curator or by an automated curation process based on various selection criteria. The selection criteria may be determined based on user groups or individual users. For example, content items are selected based on, but not limited to, an age group, a content type, popularity, and a result of a past user experience, such as a preschool test (e.g., reading and identifying basic colors). The curated content subscription service offers a personalized content curation service to a discovery user.

The present content curation system provides a discovery user having a subscription with a user interface application that authorizes the discovery user to access a curated content item. The limited time curation allows the discovery user to have authorized access to a content item for a limited time period. Subject to parental approval or other authorization, the discovery user may purchase a permanent copy of the content item of a particular interest. The discovery user may also purchase a usage right for streaming of video and music content, and download an electronic book and an application.

According to one embodiment, the present curated content subscription service provides different levels of content curation to help a discovery user to navigate through the subscription content. For example, a first level provides content items across mixed content types. The user interface displays a plurality of content items of mixed content types across different themes. The user interface also provides a direct access to download or open applications within content screens grouped by the thematic categories. A second level offers different views of the content within the media player for accessing content items. Referring to FIG. 1, the first and second levels are curated by the curating module 103 in collaboration with the content provider server 101, according to one embodiment. The application may be downloaded, installed, or opened from an icon that links to the application shown on the first and second levels. Depending on the agreement with the content provider server 101, the present content curation system may host the content items or collaborate with the content provider server 101 to host their content items on the platform of content provider server 101.

The present content curation system refreshes content items based on a specified curation period, for example, a week, a month and a quarter. The present content curation system may allow popular content items to expire earlier than a specified curation period to provide an opportunity to upsell the popular content items to a control user. The present content curation system may continue offering content items after the specified curation period. For example, the present content curation system continues to offer unpopular or unexperienced content items to encourage the user to explore them. After the unpopular or unexperienced content items (e.g., a book and news) are explored by the discovery user, the present content curation system re-provides popular content items (e.g., a game and an application) to the discovery user. The present content curation system may collaborate with content providers to determine an expiry time of a particular content item and specify the duration of content subscription. The subscription service provided by the present content curation system seeks to provide a balanced mix of popular, educational, trendy, and seasonal content items for users to continue interaction with the subscription service. Content providers may be paid based on a usage model. For example, the present content curation system pays a content provider based on consumption information for a plurality of subscribing users. The usage-based revenue sharing model benefits the content curation provider as well as the content providers. The curated content items are continuously provided and updated to trigger new interests from the discovery users.

According to one embodiment, the present content curation system provides a catalog of qualified content items that is specifically tailored for a discovery user based on a collection of qualified content items. A limited number of content items within the catalog is made available to the discovery user for a specified curation period. The present content curation system determines the placement and substance of icons and descriptions for each qualified content item on the menu of the catalog on the user interface.

According to one embodiment, the present content curation system provides content items directed toward the growth and development of a discovery user (e.g., a child). A catalog of qualified content items is selected and presented to a discovery user to facilitate development and education. While a control user may be allowed to review and control the content items available to a discovery user, the present content curation system provides a curated content subscription service that the control user can trust via knowledgeable, intentional, and purposeful steps to develop the skills of the discovery user. Using the curated content items provided in a catalog format, the discovery user is provided with an opportunity to learn and explore various topics and subjects. The content items may also help the discovery user to improve interpersonal skills and social behavior, and experience calisthenics and creative exercises.

The present content curation system provides limited curation to encourage a discovery user to navigate through the curated offering of content items and facilitates the discovery of content items instead of searching content items by the discovery user. The discovery user may not know what he/she wants to do with his/her device, and are often unaware of fun and beneficial opportunities. The present content curation system provides an informed judgment to discern appropriate alternatives to a discovery user. The present content curation system promotes a continuing and dynamic discovery process that strengthens a user's engagement with content items offered on his/her device, and stimulates future use of his/her device. The curation process provides a quantity of different content types, levels and subject matters of user experiences to captivate and activate users.

The present content curation system provides limited content curation that changes content items that are provided to a discovery user. The user interface displays curated content items that are intended to engage and catch a discovery user's attention in a central portion of the user interface. The present content curation system substitutes content items after a specified curation period. Furthermore, the present content curation system may update curated content items based on a combination of a specified curation period and an occurrence of a triggering event. The present content curation system provides a streamlined process of content acquisition, scheduling, determining priority, categorizing, placement, and receiving feedback on the usage of curated content items. In one embodiment, the present content curation system provides criteria to aid in the process, for example, a content mix, a brand, a character popularity, a cultural trend, an event, a season, an associated content priority, shelf life limitation, a promotional schedule, and a standard for child development, pedagogical methodologies and effective measurements of user's interactions and activities.

According to one embodiment, the present content curation system continues a theme from a first specified time curation period to a second specified time curation period to provide different content items and different focuses or narrations related to the same theme. For example, the present content curation system provides a "Friends and Family" theme that features parents and siblings for one month, and features friends and neighbors in another month.

Figure 6:
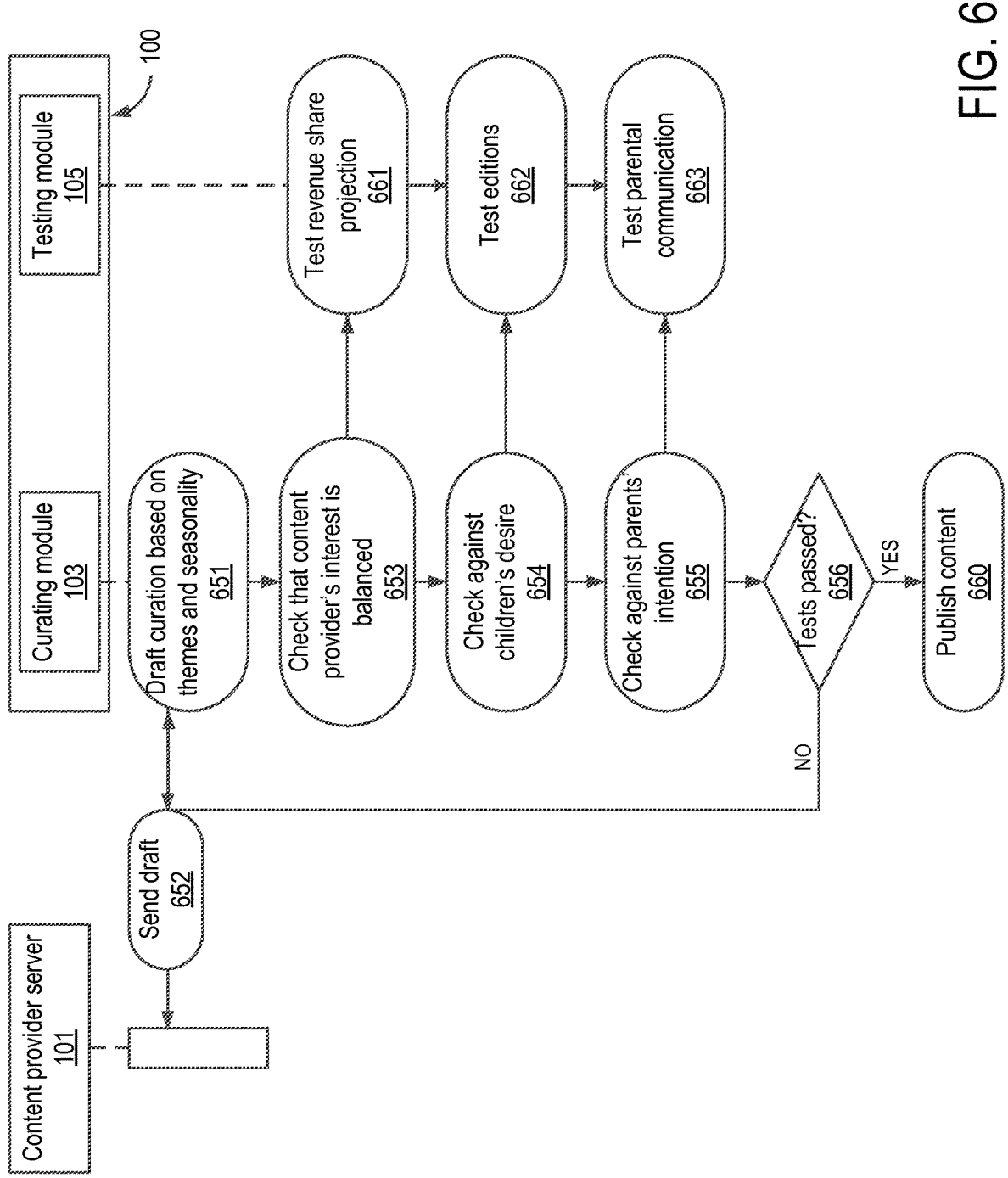
FIG. 6 illustrates an exemplary flow chart for balancing curation interests, according to one embodiment.

FIG. 6 illustrates an exemplary flow chart for balancing curation interests, according to one embodiment. The present content curation system 100 illustrated in FIG. 1 further includes a testing module 105. In addition to publishing content items for a limited time period (e.g., a month, a quarter, and a year), the curating module 103 prepares a draft of content curation based on themes and seasonality (at 651) and provides the draft to the content provider server 101 (at 652). Based on a revenue share model with the content provider 101 for each content type, the content curator 103 confirms that the content provider 101's interests (e.g., a promotional campaign of a new song, a new movie title, and a new application) are balanced (at 653). In response, the testing module 105 tests the revenue share projection (at 661). For each demographic group (e.g., an age, a gender, and a location), the content curator 103 checks that the content items reflect what the primary users (e.g., children) desire (at 654). The testing module 105 tests various editions of curated content groups for target demographic groups (at 662). The content curator 103 also checks whether the content items marketed to parents are performing as intended by referring to a parental feedback (at 655). The testing module 105 tests parental communication (at 663). If all tests are passed (at 656), the curating module 103 publishes the content items for each theme and content type for the current specified curation period (at 660). The curating module 103 repeats the curation process by drafting the curation for a subsequent limited time period.

Figure 7:
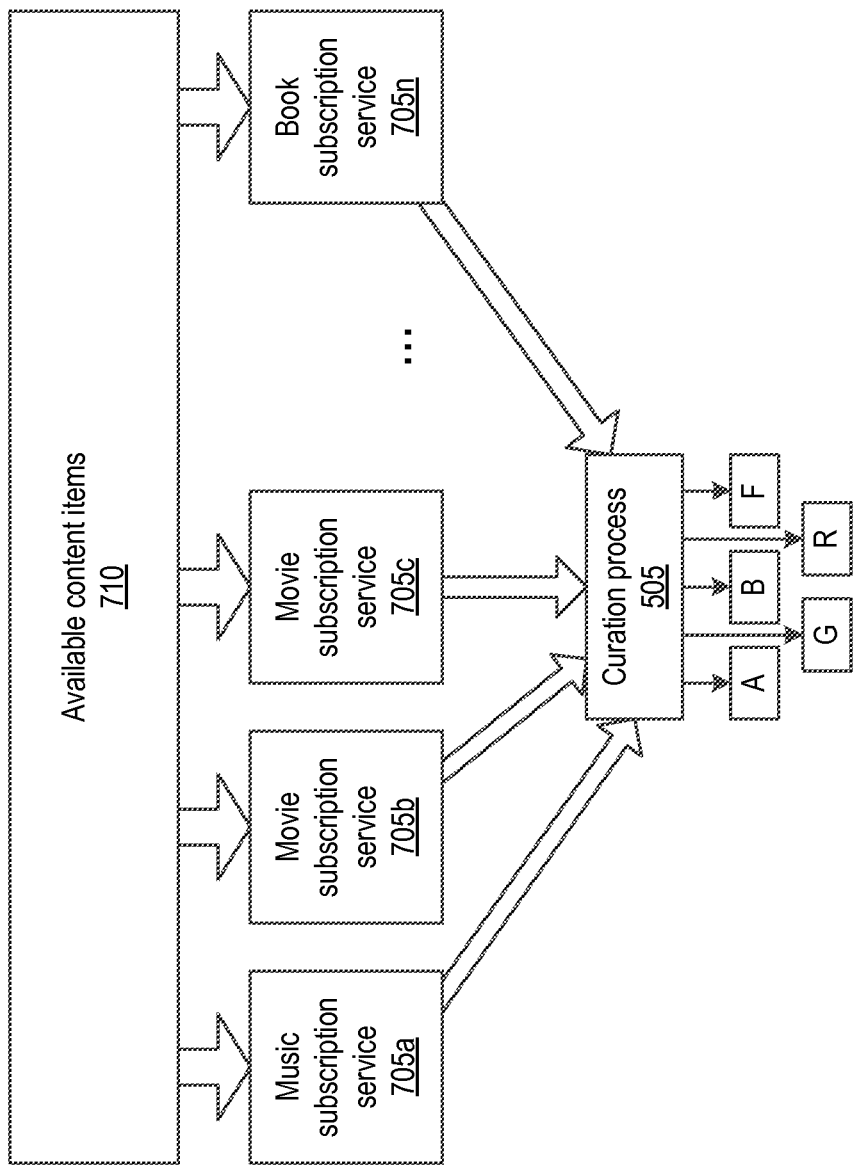
FIG. 7 illustrates an exemplary process of content curation using a curated content subscription service, according to one embodiment.

FIG. 7 illustrates an exemplary process of content curation using a curated content subscription service, according to one embodiment. The present content curation system provides a content curation process 505 that receives subscription services from multiple content subscription service providers 705a-705n of different types of media including music, a movie, an electronic book, and a game. The content curation process 505 unifies the subscription services to multiple content subscription service providers 705 and generates a limited number of content items per themes A, B F, G, and R. The selection of content items may be based on an agreement with each of the content subscription service providers 705. For example, certain content items are available for streaming, and other content items may be available only for a purchase. Since the content curation process 505 manages the subscription to the content subscription service providers 705, a discovery user who subscribes to the present content curation service does not need to manage individual subscriptions with the content subscription service providers 705. The present content curation system provides the discovery user with a unified user interface to access different types of content items from different content subscription service providers 705.

Dual Mode

According to one embodiment, the present content curation system provides curated content items in a dual mode. A dual mode operation of a computer's operating system (OS) provides a first type of user interface or profile for a discovery user (e.g., a discovery mode) and a second type of user interface or profile for a control user (e.g., a control mode). An example of a dual mode operation of a tablet computer is described in U.S. Patent Publication No. 2013/0254660.

According to one embodiment, the present system and method includes a curated content subscription service that provides a subscription account associated with two or more accounts to provide custodial content management and publication. For example, the curated content subscription service is a parent-child subscription service. The curated content subscription service provides a subscription account associated with at least one control user account (e.g., for a parent) and a discovery user account (e.g., for a child). Although different user interfaces are provided for the control user account and the discovery user account, both accounts are managed under the same subscription account of the curated content subscription service. The curated content subscription service allows the control user to provide curated content items to a corresponding discovery user for educational, developmental, and entertainment benefits.

According to one embodiment, the present content curation system provides qualified and curated experiences to a discovery user. The discovery user selects an icon of a corresponding content item, and consumes the content item by learning, playing with, and growing from the content item. The curated content items may be selected from a library of various content types including a video, music, an electronic book, a game, and an activity. The present content curation system identifies specific user experiences to offer to one or more of the discovery user and the control user. Different user experiences may be provided to a discovery user and a control user.

The present content curation system qualifies user experiences that are made available to a discovery user. The standards for qualification may vary depending not only on the demographics of the discovery user (e.g., an age, a location) but also on the type of content items such as a video, music, an electronic book, a game, and an activity. The qualification process employed by the present content curation system finds content items that meet applicable standards (e.g., kid safe, fun, and education). According to one embodiment, the qualified content items are categorized for facilitating the discovery user's discovery and for proper assessment by user interactions.

According to one embodiment, the present content curation system creates a plurality of subscription service modes based on a target demographic group. A demographic group includes, but is not limited to, an age group, a common interest group (e.g., a cooking group and a sports group), an education group (e.g., a student group), a business group, and a geographic group. The present content curation system allows a discovery user to access a subscription service mode, for example, using a mode icon on a user interface of a user device. For example, a cooking group has access to a kitchen mode, a business group has access to a business mode, for example, a HSN® mode, a BEST BUY® mode, or a WALMART® mode. Each subscription service mode may have a unique look and feel. For example, the present content curation system configures celebrity chef cooking shows, recipes, search controls for recipes and ingredients, and electronic commerce for a kitchen mode. The electronic commerce configuration of the kitchen mode allows a user to purchase a physical item through a partner of the present content curation system, for example, an online kitchen store and an online food store.

According to one embodiment, the present content curation system allows a control user of a subscriber account to select a subscription service mode and associates the subscriber account with the subscription service mode. The present content curation system provides the subscription service mode to a discovery user and the control user of the subscriber account and selects a set of content items from the plurality of available content items provided by the plurality of content provider servers based on the subscription service mode.

According to one embodiment, different subscription service modes have common attributes, including, but not limited to, an organization of content by themes, and multiple content types of curated content. Each subscription service mode may further have specific attributes such as a rewards system, electronic commerce features, access controls, and discovery and learning paths. According to one embodiment, the present content curation system analyzes user activity in an application associated with a subscription service mode and applies the analyzed user activity in another application associated with the mode. For example, the present content curation system allows a shopping list created by a discovery user of a kitchen mode in an application to be fulfilled by one or more third party retailer applications.

According to one embodiment, an organization of content by themes may be common to a plurality of subscription service modes, such as a kitchen mode and a sports mode. However, the present content curation system may configure a type of theme for each subscription service mode. For example, a kitchen mode includes an ethnic food theme (e.g., Chinese, Italian, Mexican, Japanese, French), a healthy diet theme (e.g., light cooking, healthy foods), and a food type (e.g., sandwiches, salads).

According to one embodiment, an organization of content by multiple content types may be common to a plurality of subscription service modes. However, the present content curation system may configure a range and a balance of content types for each subscription service mode. For example, a kitchen mode may include a range and a balance of electronic books, videos, cooking class ware, applications, and articles that are different from other modes.

Conditions for Refreshing Curated Content Items

According to one embodiment, the present content creation system provides a curated content subscription service to a user by refreshing or updating a limited number of content items provided to the user based on determining that the predetermined information regarding the user's content consumption matches a given pattern or metric (e.g., a triggering event that is prescribed by the control user or by a curator). For example, the present content curation system removes a content item from the limited number of content items when a discovery user's consumption information reaches or exceeds a threshold number of times or a threshold frequency of consumption of the content item. The threshold number of times or the threshold frequency of consumption of the content item may be determined by a control user and/or a curator. In another example, the present content curation system refreshes the limited number of content items to include content items that have a related topic or theme to a desired content item when a discovery user completes a consumption of one or more content items from the limited number of content items of a given topic or theme. The desired content item may be determined by a control user and/or a curator.

According to one embodiment, the present content curation system refreshes or updates a limited number of content items based on a triggering event, such as an event that occurs in a discovery user's content consumption information, for example, a completion of a task, a threshold number of accesses, and a threshold frequency of access to a given content item. The triggering event may be based on predetermined information regarding a user's content consumption of a first limited number of content items. The present content curation system may refresh or update content items to provide a second limited number of content items from a plurality of available content items based on one or more of a triggering event and a limited curation time period. For example, the present content curation system refreshes content items at fixed time intervals, and optionally updates content items at other times based on the occurrence of a triggering event.

According to one embodiment, the present content curation system provides a second limited number of content items from a plurality of available content items based on a triggering event that indicates that a discovery user has consumed a first limited number of content items associated with a first topic. The present content curation system provides the second limited number of content items related to a second topic. This provides well-balanced content consumption by helping the discovery user to avoid being addicted to particular content items and encourages the user to consume varied and rewarding content.

According to one embodiment, the present content curation system provides a first limited set of content items that includes a game X. To achieve a discovery goal of discouraging addictive content consumption, the present content curation system receives predetermined information that includes a maximum number of times of consumption of game X. The present content curation system provides a second limited set of content items that excludes game X based on a triggering event that indicates that a number of times of consumption of game X matches the maximum number of times.

According to one embodiment, the present content curation system provides a first limited set of content items of topic X. To encourage discovery of related topics/themes, the present content curation system receives predetermined information that includes a consumption of a desired number of content items of topic X. The present content curation system provides a second limited set of content items of topic Y that is of a related topic to topic X based on a triggering event that indicates that the discovery user has completed consumption of at least the desired number of content items of topic X from the first limited set of content items.

According to one embodiment, the present content curation system provides a first limited set of content items of topic X. To encourage discovery of divergent topics/themes, the present content curation system receives predetermined information that includes a consumption of a desired number of content items of topic X. The present content curation system provides a second limited set of content items of topic Y that is of a divergent topic from topic X based on a triggering event that indicates that the discovery user has completed consumption of at least the desired number of content items of topic X from the first limited set of content items.

According to one embodiment, the present content curation system provides a first limited set of content items featuring an introductory topic. To encourage exploration of areas of interest within a broad topic or theme, the present content curation system receives predetermined information that includes a consumption of a desired number of content items on the introductory topic. The present content curation system provides a second limited set of content items of topic Y that is of a more advanced topic than topic X based on a triggering event that indicates that the discovery user has completed consumption of at least the desired number of content items of the introductory topic from the first limited set of content items.

According to one embodiment, the present content curation system provides a first limited set of content items of a development/educational topic. To reward a user for diligence in pursuing a development/educational topic, the present content curation system receives predetermined information that includes a consumption of a desired number of content items on a development/educational topic. The present content curation system provides a second limited set of content items featuring a desired character based on a triggering event that indicates that the discovery user has completed consumption of at least the desired number of content items of the development/educational topic from the first limited set of content items.

According to one embodiment, the present content curation system provides adaptive discovery of content items. In adaptive discovery, the present content curation system identifies an emerging trend to identify a theme and a topic in the limited content curation collection. The present content curation system provides associated content items to a discovery user based on a user trend from a plurality of discovery users. The present content curation system receives consumption information for a plurality of discovery users and determines a user trend based on the consumption information.

For example, the present content curation system determines a user trend that discovery users who consume content items with a topic in cats also consume content items with a topic in dinosaurs. The present content curation system determines the user trend based on consumption information that includes an indication that a plurality of discovery users that consumes content items with a topic in cats also consumes content items with a topic in dinosaurs. The present content curation system may receive the indication based on determining that the plurality of discovery users meet or exceed a threshold number (e.g., 10,000). The present content curation system may also receive the indication based on determining that the plurality of discovery users consume content items with the topic in cats and the topic in dinosaurs a number of times that meet or exceed a threshold number (e.g., consume 100,000 times). The present content curation system then provides content items with a topic in dinosaurs to a discovery user that consumes content items with a topic in cats based on the indication.

The present content curation system performs tests and applies metrics (e.g., the most viewed/played content items in the last 30 days) to a proposed limited content curation collection and adjusts the limited content curation collection based on determining whether the adjusted content curation collection is well-balanced (e.g., by a content type, a theme, and a topic) and/or whether the adjusted content curation collection satisfies the need of target demographics of the discovery user (e.g., an age group, a gender). The determination of whether a content curation collection is well-balanced may be based in part on curatorial objectives tailored to the target demographics of the discovery user, for example, for children providing a balance of enhanced learning, skill mastery, development of values, and fun. The present content curation system also reviews parental feedback and determines whether content items within the adjusted content curation collection satisfy a parental need and goal.

According to one embodiment, the present content curation system provides an adaptive discovery of content items that alters curated content items based on a user level and a user choice. Adaptive discovery encourages the user to explore new activities and subjects and/or drive to a higher and comprehensive level of experience for which the user has shown an aptitude.

According to one embodiment, the present curated content subscription service includes an adaptive learning system. The present curated content subscription service makes use of various instructional components of a fundamental adaptive learning system ("FALS"). FALS and the content discovery provided by the present content curation system may include overlapping approaches to child education and development. For example, the present curated content subscription service rewards successful achievement of developmental goals identified with content items (via metatags) through indirect instructional components of FALS, such as a control user-authorized purchase of content items sampled during discovery. Another example is an adaptive learning dashboard that includes information on a discovery user's discovery history, such as information on a subject matter or a theme of interest to the discovery user as indicated by discovery statistics. The present content curation system may determine discovery statistics by tracking discovery user activity, such as a search term, an item description pages viewed, and time spent on consuming a type of content, for example, a video, music, an electronic book, and an educational material.

According to one embodiment, the present content curation system provides a discovery path for a user. Completion of a discovery path demonstrates proficiency in the fundamental skill set. The discovery path may be programmable so that a discovery path of the curated content can be changed to adapt to a real-world school curriculum or syllabus. The discovery path permits customization of the FALS system to align with different course content and/or teaching techniques that may be used with a given individual or educational institution.

Figure 8:
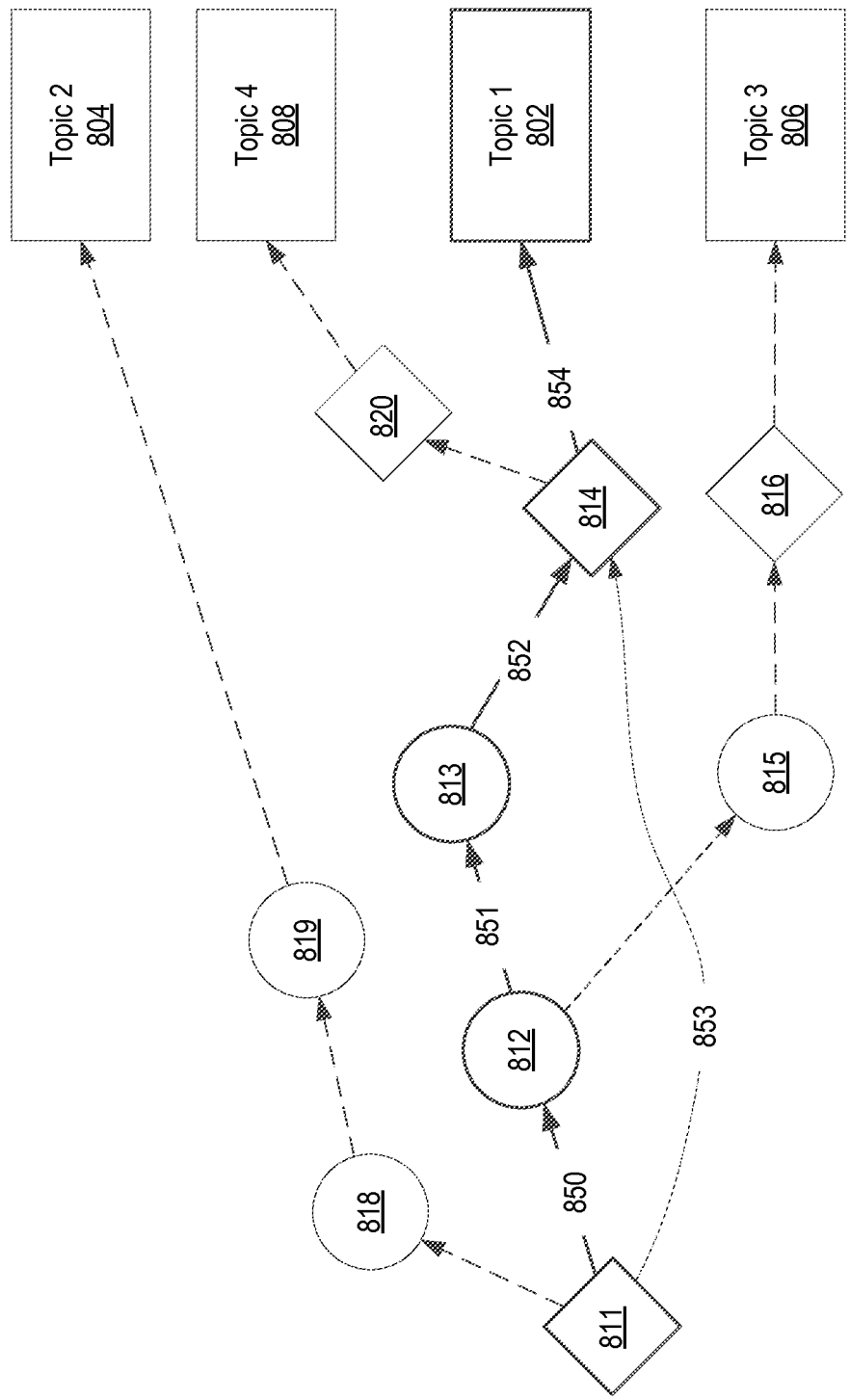
FIG. 8 illustrates a discovery path for attaining and demonstrating proficiency, according to one embodiment.

FIG. 8 illustrates a discovery path for attaining and demonstrating proficiency, according to one embodiment. The curator of the present content curation system prepares discovery paths for Topic 1 802, Topic 2 804, Topic 3 806 and Topic 4 808. The discovery path for Topic 1 802 includes content items 811, 812, 813, and 814. The discovery path for Topic 2 804 includes content items 811, 818, and 819. The discovery path for Topic 3 806 includes content items 811, 812, 815, and 816. The discovery path for Topic 4 808 includes content items 811, 812, 813, 814, and 820. It is understood that the present content curation system may include any number of discovery paths having any number of content items without deviating from the scope of the present disclosure. The present content curation system requires a discovery user to consume milestone content items including content items 811, 814, 816, and 820 before advancing to consume a subsequent content item. The present content curation system requires a discovery user to complete a discovery path to demonstrate proficiency of a corresponding topic. After the discovery user experiences a content item, the present content curation system encourages the discovery user to discover a subsequent or additional content item in the discovery path. Examples of a discovery path include, but are not limited to, a story arc, a character arc, a theme, and a mixed content type associated with a story, a character, and/or a theme.

According to one embodiment, the user may become proficient with Topic 1 by completing content items 811, 812, 813, 814 as indicated by the paths 850, 851, 852, and 854. Depending on the user's proficiency in completing content items, the user may follow an alternative path as indicated by the paths 853 and 854. As shown, a user may bypass a consumption of content items 812 and 813 and proceed to consume content item 814 after consuming content item 811.

In one embodiment, content items may be shared among different topics. For example, content item 811 is a shared milestone lesson that begins the paths necessary to attain proficiency in Topic 1 802, Topic 2 804, Topic 3 806, and Topic 4 808. In particular, a user progresses through content items 811, 818 and 819 to attain proficiency in Topic 2 804.

According to one embodiment, a group of content items in a discovery path is arranged in close proximity on a user interface to encourage a discovery of the content items. For example, a group of content items that are required to be consumed by a discovery user to complete a topic is arranged horizontally or vertically in a scroll bar. In one embodiment, the present content curation system does not require a discovery user to consume content items in a discovery path in a pre-determined order. As long as the discovery user consumes content items defined in a discovery path, the user is considered proficient in the corresponding topic. In another embodiment, a user is required to experience or consume content items of a discovery path in a pre-determined order to complete the discovery path.

A discovery path has logical interrelationships among content items in a discovery path. For example, a discovery path is a serial where a starting point may lead to multiple discovery paths depending on the path chosen by a discovery user or determined by the present content curation system. The successful completion of a discovery path may lead to a curator's or system's selection or suggestion of a suitable further discovery path, for example, a related narrative that is suited for a discovery user's interest and aptitudes, or a parental selection.

Figure 9:
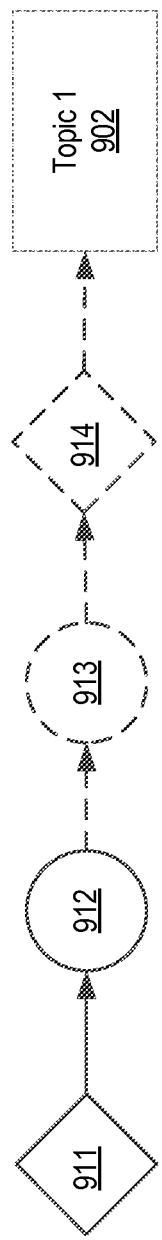
FIG. 9 illustrates an exemplary discovery path with locked content items, according to one embodiment.

FIG. 9 illustrates an exemplary discovery path with locked content items, according to one embodiment. The discovery path for Topic 1 902 includes content items 911, 912, 913, and 914. Content items 911 and 914 are milestone content items in the discovery path. Content items 911 and 912 are unlocked whereas content items 913 and 914 are locked. Unlocking a content item in a discovery path achieves a controlled sequence of topic completion. Initially, the discovery user only has the first content item 911 available in the discovery path. If the discovery user completes the content item 912, the next content item 913 in the sequence is unlocked. The present content curation system provides guidance to steer the discovery user to navigate the discovery path to a subsequent content item in the discovery path. When the content item 912 is consumed by the discovery user, content item 913 unlocks and becomes available to the discovery user.

According to one embodiment, the discovery of content toward proficiency in a topic is dynamic. The present content curation system determines a score for the discovery user based on the discovery user's experience with the content item. For example, the present content curation system determines a score based on a time for accessing the content item, a quiz score after accessing the content item, and a level of user interaction with the content item such as a number of clicks or a cursor movement. The present content curation system determines a higher score for a successful completion of a content item that is indicated by a start of the content item to the end of the content item than a partial completion of the content item. The present content curation system may convert the score to virtual currency for the discovery user to purchase a content item or to play a game that has a limited playing time on the content curation system. According to one embodiment, when the discovery user consumes or completes a content item with a minimum target score, the present content curation system reveals subsequent content items that are available to the discovery user in a linear fashion, for example, one content item at a time. According to another embodiment, when the discovery user consumes or completes a content item with a desired score, the present content curation system unlocks some or all content items up to the a subsequent milestone, thus allowing the discovery user to bypass consumption of certain content items along the discovery path.

In one embodiment, scoring of a content item facilitates a content review and assessment. A third party rating or an industry rating and usage metrics of a particular content item may be used in determining a score of a content item on an aggregate and sub-group (e.g., ages 2-5, 6-9) basis. Based on the scores and usage metrics of content items, a more efficient discovery path may be established by including content items and a mix of different content types of content items that are expected to deliver a more efficient discovery path of a topic.

According to one embodiment, the present content curation system monitors the discovery user's progression in a discovery path. Based on the discovery user's progression in a discovery path, the present content curation system dynamically adapts the discovery path by redirecting a user to a new discovery path, adding, deleting, and/or modifying content items in the current discovery path.

Figure 10:
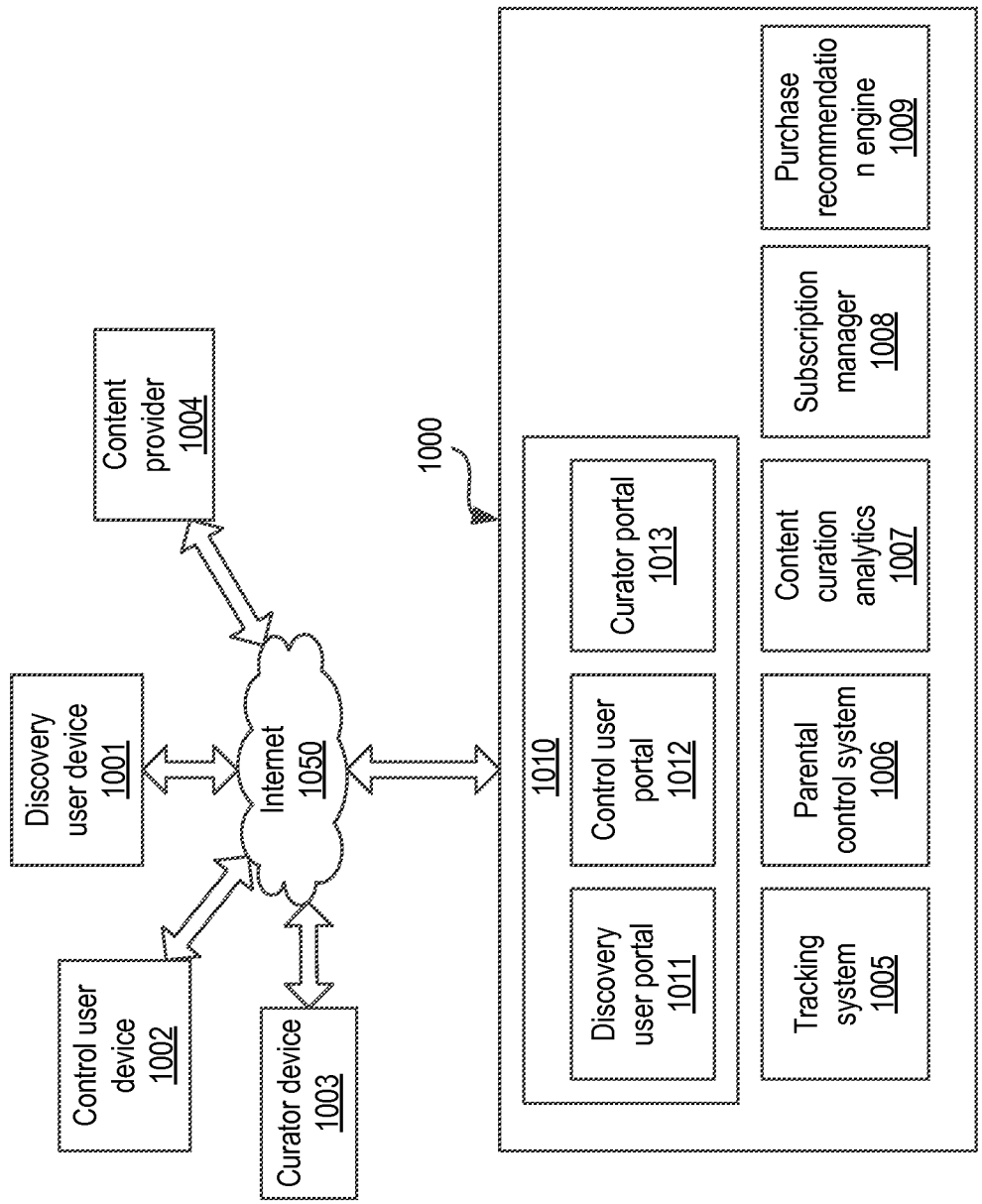
FIG. 10 illustrates a block diagram of an exemplary content curation system, according to one embodiment.

FIG. 10 illustrates a block diagram of an exemplary content curation system, according to one embodiment. The content curation system 1000 includes a tracking system 1005, a parental control system 1006, a content curation analytics engine 1007, a subscription manager 1008, a purchase recommendation engine 1009, and a web interface 1010. The web interface 1010 has a control user portal 1012, a curator portal 1013, and a user portal 1011 to provide a respective interface to a discovery user (e.g., child) device 1001, a control user device 1002, and a curator device 1003 via the Internet 1050. A discovery user may access the content curation system 1000 by logging in to a discovery user mode on the discovery user device 1001 using a discovery user account. A control user may access the content curation system 1000 by accessing a control user mode on the control user device 1002 (or the discovery user device 1001) using a control user account. According to one embodiment, the discovery user account and the corresponding user account are part of a common subscription account of the present curated content subscription service. It is understood that the curator device 1003 may be part of the content curation system 1000 without deviating from the scope of the disclosure. The curator portal 1013 may be provided to an internal curator within the content curation system 1000 instead of the curator device 1003 via the web interface 1010. The content curation analytics 1007 provides a limited number of content items from a plurality of available content items provided by the content provider 1004 to a discovery user based on various factors including, but not limited to, a season, an event, a character, a relation, a geographical location, consumption information, a desired content item provided by the content provider 1004, and a promotional campaign provided by the content provider 1004. It is understood that the content curation system 1000 may receive content items from any number of content providers without deviating from the scope of the present disclosure. According to one embodiment, a user accessing the curator portal selects a subset of content items from the limited number of content items to further limit the number of content items to present to the user for a limited curation time period.

The tracking system 1005 receives consumption information of the discovery user including usage metrics of the content items from the discovery user device 1001. The content provider 1004 may send the consumption information of the discovery user to the content curation system 1000 via the Internet 1050. A user may tag content items available from a content library via the curator portal 1013. According to another embodiment, the content curation analytics tags the content items. The tracking system 1005 uses the tagging information when monitoring usage of content items. The tracking system 1005 tracks usage metrics of content items from the discovery user device 1001, for example, by detecting the user consumption of content items in a discovery path. The tracking system 1005 further determines a related content item that has not been consumed by the discovery user in a discovery path. The tracking system 1005 may further track and aggregate usage metrics of content items from a plurality of discovery users via their respective discovery user devices 1001.

According one embodiment, the tracking system 1005 communicates with a discovery user device 1001 via a web socket installed on the discovery user device 1001. In one embodiment, a browser of the discovery user device 1001 uses a client program to create a connection with a server of the content curation system 1000 and establishes a web socket in the browser. The web socket is further used to communicate with the content curation system 1000 when receiving content items from the content curation system 1000 or directly from the content providers 1004.

According one embodiment, the present content curation system sends a message to a discovery user based on the discovery user's progression in a discovery path. The web socket established between the content curation system 1000 and the discovery user device 1001 may be used to send a message to the discovery user. In one embodiment, a web socket is established between the content curation system 1000 and a control user device 1002 (or the discovery user device 1001 if the control user accesses the control user mode on the discovery user device 1001). The content curation system 1000 sends a message to the control user device 1002 including a report of the discovery user's consumption information to the control user. The consumption information of the discovery user includes, but is not limited to, a title of a content item, a start time of accessing the content item, an idle time during an access of the content item, a finish time of accessing the content item, a number of times of consumption of the content item, and a number of successful completion of the content item. For example, a timer starts when a discovery user opens a page of an electronic book, and the timer stops when the discovery user closes the electronic book. The timer may run on the client program even when the discovery user device 1001 does not communicate with the content curation system 1000. If the content curation system 1000 determines that an undiscovered content item requires more time to consume than allowed based on a parental time control, or if a content item is expressly excluded in a discovery path by the parental control, the content item is excluded from a list of suggested content items.

In another embodiment, the present content curation system sends a guided message to help the discovery user discover a curated content item in the discovery path. For example, a voice message of a curator of the content curation system 1000 may be automatically sent to the discovery user to encourage the discovery user to consume a specific content item. In another example, a comment field of a message includes the curator's message guiding the discovery user with an explanation of a step to complete a discover path. The messaging feature of the content curation system 1000 provides a tool for a curator to communicate with a discovery user while providing various supporting tools for guiding the discovery user to discover curated content items aligned with a planned discovery path.

According one embodiment, the parental control system 1006 provides a parental control of content items that are presented to a discovery user. The parental control system 1006 may be embedded across multiple discovery user profiles and across different user interfaces or user devices that are registered with the content curation system 1000. A control user enters a password to gain access to the control user portal 1012. The parental control system 1006 receives a usage report from the user device 1001 including the consumption information of content items for the discovery user in a discovery path. The control user portal 1012 may enable a control user to modify limited content curation provided by the system curator or the present content curation system to provide a customized or personalized curation for a discovery user. The control user portal 1012 may incorporate controls for creation or modification of customized curations, such as a menu of content collections (e.g., a theme) and a title, to be selected for inclusion or exclusion, discovery path controls, content duration controls, and access controls (e.g., time-of-day access, day-of-the-week access).

Using the control user portal 1012, the control user may act as a secondary curator. According to one embodiment, the control user uses the control user portal 1012 to establish a discovery path, or to modify a discovery path by selecting, adding, and/or deleting content items in the discovery path. According to one embodiment, the control user uses the control user portal 1012 to exclude certain content items from content available for discovery by a discovery user (e.g., a child). The control user portal 1012 may notify a control user of an expiration date of a content item included in a discovery path or other parental curations so that the control user may be aware of the content item that may become unavailable before the discovery user completes the discovery path.

According to one embodiment, the parental control system 1006 further includes a shared curation list that includes curated data such as curation lists from a plurality of control users. The control user portal 1012 includes a control for publishing a control user's curated data to a shared curation list on a community portal that is accessible to other control users. According to one embodiment, the discovery user portal 1011 displays a shared playlist of content items consumed by a plurality of discovery users.

The control user portal 1012 may include a rewards system, which may be similar to indirect instructional components of FALS. For example, a control user (e.g., a parent) using the control user portal 1012 may award virtual currency upon an achievement of a pre-defined discovery goal that enables a discovery user (e.g., his/her child) to purchase a content item sampled during discovery.

The control user portal 1012 allows the control user to review an achievement of the discovery user. The parental control system 1006 receives a usage report from the discovery user device 1001 including the consumption information of content items for the discovery user in a discovery path. According to one embodiment, the content curation system 1000 presents customized information based on the consumption information of a discovery user. The content curation analytics engine 1007 uses the customized information and provides suggestions for establishing and modifying a discovery path, including selecting, adding, and/or deleting content items in a discovery path designed for the discovery user.

According to one embodiment, the content curation analytics engine 1007 may analyze customized information to determine a desired size of the curated content collection, a desired mix of genres and/or content types for the curated content collection, and a desired time period for the curated content collection based on limited curated content heuristics. The content curation analytics engine 1007 analyzes consumption information from one or more discovery users based on trial and error to adjust a balance across different segments (e.g., a content type, a genre) of the limited curation collection. The limited curated content heuristics may make use of various curation analytics as inputs. The curation analytics include, but are not limited to, collection analytics, balance analytics, popularity analytics, and associative content analytics. The collection analytics include statistics related to a limited curation collection, for example, a volume and consumption statistics. The balance analytics include statistics related to a balance among different categories of a limited curation collection, for example, a relative frequency of different genres or different content types. The popularity analytics include a frequency of consumption of different titles or different groups of content items. The associative content analytics include consumption of groups of associated content items, for example, information indicating that one or more discovery users are consuming an entire curation collection or most content across groups of content items. For example, if a group of curated content items is not consumed by a plurality of discovery users, the content curation analytics engine 1007 rebalances the curation collection by omitting the group of curated content items.

The content curation analytics engine 1007 also communicates with the content provider 1004 to make further refinement to the curation process based on various factors including consumption information, a desired content item provided by the content provider 1004, and a promotional campaign by the content provider 1004. Based on a successful completion of a content item or a topic, the discovery user may be awarded with virtual currency. The earned virtual currency allows the discovery user to unlock additional content items and progress toward the completion of a discovery path.

The subscription manager 1008 manages subscriptions to multiple content subscription service providers including content provider 1004. It allows a discovery user to access content items available from multiple content subscription service providers from the discovery user portal 1011. Therefore, the discovery user does not have to maintain individual subscriptions to multiple content subscription service providers.

According to one embodiment, the content curation system 1000 identifies a group of associative content items associated with content items contained in a discovery path. The associative content items may be presented to a control user, a curator, and/or a discovery user via the control user portal 1012, the curator portal 1013, and/or the discovery user portal 1011 respectively. For example, an associative content form includes, but is not limited to, a content description (e.g., a text box), a content title, a content type (e.g., a drop-down list for choices of keyword, trans-media group, provider bundle, and content curator bundler), an available time (allowing a curator to establish associative content groups for a limited time period, for example, a single subscription period), and a fixed order (allowing a curator to select whether or not to fix the order of the titles).

According to one embodiment, the content curation system 1000 provides a discovery path via the control user portal 1012, the curator portal 1013, and/or the discovery user portal 1011. The discovery path defines a desired path for discovering content items in a pre-determined sequence by the content curation analytics 1007 or a control user. In one embodiment, a discovery path transitions between a current (indicated by "current") content item that is consumed by a discovery user, and a subsequent (indicated by "next") content item that the content curation system 1000 suggests or selects as the next content item for the discovery user. For example, a discovery path form includes, but is not limited to, a transition type, a path element, a discovery path type, and a discovery path message.

The transition type defines the types of content items. For example,
 a. current=title 1, next=title 2
 b. current=title 1, next=associated content group 1
 c. current=associate content group 1, next=title 1
 d. current=associate content group 1, next=associated content group 2

The path element may depend on a transition type and prompts a discovery user to select the "current" and "next" content items from the content library. For example, the discovery path type provides a drop-down list of types of discovery scenarios such as serial, trans-media, story arc, character arc, apparent interest, and divergent from apparent interest. The discovery path type may be used to select among standardized messages for suggesting the next content item to the discovery user. The discovery path message provides a text input that allows the curator to provide a customized message to the discovery user.

According to one embodiment, the present content curation system utilizes data from a time control report and provides insight into the discovery user's activities. The usage data contained in the time control report is provided to the content curation analytics 1007 to monitor the discovery user's activities and analyze the navigation and consumption habits of the discovery user to improve the curation of content items and plan a discovery path for other discovery users.

The purchase recommendation engine 1009 recommends one or more of a physical item and a virtual item for purchase by the discovery user via the discovery user portal 1011 and/or the control user via the control user portal 1012. The physical item and virtual item may be associated with a content item that is present to the discovery user via the discovery user portal 1011. For example, the purchase recommendation engine 1009 recommends a physical item that is a stuffed toy of a character in a cartoon video content item. The virtual item includes, but is not limited to, a movie, a video, an audio file, an electronic book, and an application. For example, the purchase recommendation engine 1009 recommends a "Frozen" game application and a "Frozen" electronic book for a "Frozen" movie content item.

According to one embodiment, the present content curation system provides a discovery path to encourage a discovery user to purchase a content item. For example, the content curation analytics 1007 prepares group A of content items for a current limited curation time period and group B of content items for a subsequent limited curation time period. Before the current limited curation time period expires, for example, 7 days before the launch of the curation period for group B, the content curation analytics 1007 compares group A and group B and determines content items that are not to be transferred from group A to group B based on various system and user parameters as described above. The content curation analytics 1007 sends a message to the discovery user notifying of an upcoming expiration of those content items at the end of the current limited curation time period and encourages the discovery user to purchase them. For example, a content item in group A is a trial version. In this case, the message includes a one-click-buy button or an instruction to purchase the expiring content item such as a movie, a comic, an electronic book, and an application.

According to one embodiment, the present content curation system provides a bundled group of content items and delivers a message to a discovery user based on the discovery user's consumption information to prompt the discovery user to finish consumption of the bundled group. For example, a bundled group titled "Batman" includes a movie, comics, and an application. When a discovery user has consumed two of the three items, the present content curation system sends a message to inform the discovery user that there remains another content item available in the bundled group "Batman" for the discovery user to consume.

User Interface

According to one embodiment, the present content curation system includes a user interface for providing curated content items to a discovery user (e.g., a child) that includes, but is not limited to, a banner below a content type, a new button/tab indicating latest content items in a curation library, a partner page, a home page, an all button indicating all content items, categories including a theme (e.g., dogs) and a genre (e.g., action, comedy), and an electronic commerce page that provides purchase recommendations for a physical item and/or a virtual item associated with a content item. For example, a user interface for a partner page may include various types of content items that are provided by a partner content provider server (e.g., DISCOVERY FAMILY®, DISNEY®, and NATIONAL GEOGRAPHIC KIDS®), such as a movie, a television show, a game, and a video. A discovery user may select an all button on a user interface to display all the curated content items that may be arranged in any order.

Figure 11:
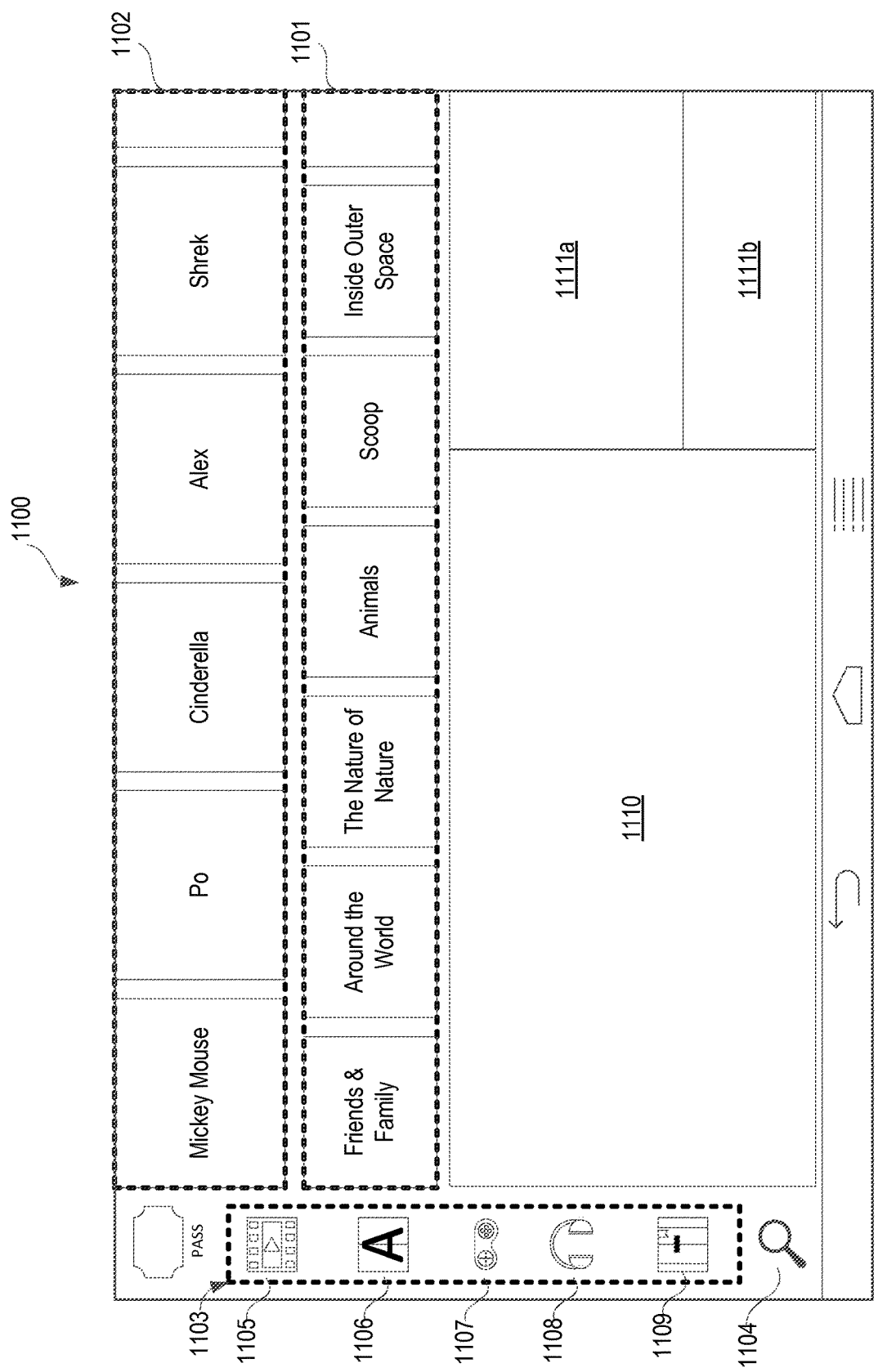
FIG. 11 illustrates an exemplary user interface for providing curated content items, according to one embodiment.

FIG. 11 illustrates an exemplary user interface for providing curated content items, according to one embodiment. A user interface 1100 for a discovery user mode provides four entry points, namely, themes 1101, characters 1102, a content type widget 1103, and a search widget 1104. The four entry points are used to initiate the user's navigation and to organize banner advertisements for the curated content item arranged in the user interface 1100.

A line of banners for themes 1101 and characters 1102 are arranged on an upper portion of the user interface 1100. Themes 1101 and characters 1102 are arranged in a horizontal scroll. The content type widget 1103 is arranged on a vertical sidebar on the left side of the user interface 1100. The search widget 1104 supports searching content items by various titles, keywords, themes, and other parameters. The present content curation system tags content items with various types of metadata to provide an enhanced search function. The search widget 1104 may also return results that are associated with the user's search terms such as a character and a theme. It is noted that themes 1101 and characters 1102, the content type widget 1103, and the search widget 1104 can be arranged in different portions and scales on the user interface 1100 without deviating from the scope of the present disclosure. The content type widget 1103 includes, but is not limited to, videos 1105, applications 1106, games 1107, songs 1108, and electronic books 1109. In a default layout, content items organized by themes 1101 and characters 1102 facilitate and encourage a user to discover content items instead of searching. The present content curation system chooses a set of active themes that represents a natural starting point for a user's discovery of content items.

The page layout defines the location and spatial relationship of the user interface (UI) elements (e.g., banners and widgets) that relate to the content items on the user interface. The page layout may favor certain UI elements by locating them in a strategic location of the user interface to draw a user's attention. For example, the user interface includes one or more featured banners having featured content items in a strategic location, for example, in the center of the user interface. The arrangement of UI elements within the page layout emphasizes the importance of certain themes, characters, and content items, and encourages a user's discovery. UI elements that appear on the active area of the user interface are favored over other UI elements that are only visible following a horizontal scroll or vertical scroll.

According to one embodiment, the present content curation system groups together UI elements that appear on the user interface. Such UI elements include, but are not limited to, banner advertisements. The UI elements arranged within the same row or column are more likely to be discovered as a series, than UI elements that do not have a spatial relationship. The grouping of UI elements facilitates the discovery of related or associative content items by arranging the UI elements of related content items together in a row or column.

Referring to FIG. 11, the user interface 1100 includes larger and more prominently placed banners 1110 and 1111a-1111b at the lower portion. The banners 1110 and 1111a-1111b feature desired content items to the discovery user. The user interface may use visual cues to encourage the discovery of certain UI elements as well as other elements such as banding, grouping, and highlighting of a screen element. The user interface may incorporate a different look and feel for different themes. For example, UI colors may change, or design features associated with a given element may change depending on the identity (and associated metadata) of the active theme.

According to one embodiment, the UI features mixed media banner advertisements. When a media banner advertisement representing a content item is selected, a media player appropriate for the content item is started. The associated content links may be pre-loaded to ensure a faster response time. Examples of media players include, but are not limited to, an application player, a game player, a video player, an electronic book reader, and a music player.

The client application running on a user device communicates with a server of the present content curation system. The server integrates multiple content delivery technology methodologies into a single offering, for example, using web banners to link to various technology platforms such as video players, third party subscription services, etc. The server also integrates the reporting and delivery structure of third party services into a pre-authenticated and approved system. This enables a discovery user to access content items from multiple content providers using one subscription with the present content curation system.

Figure 12:
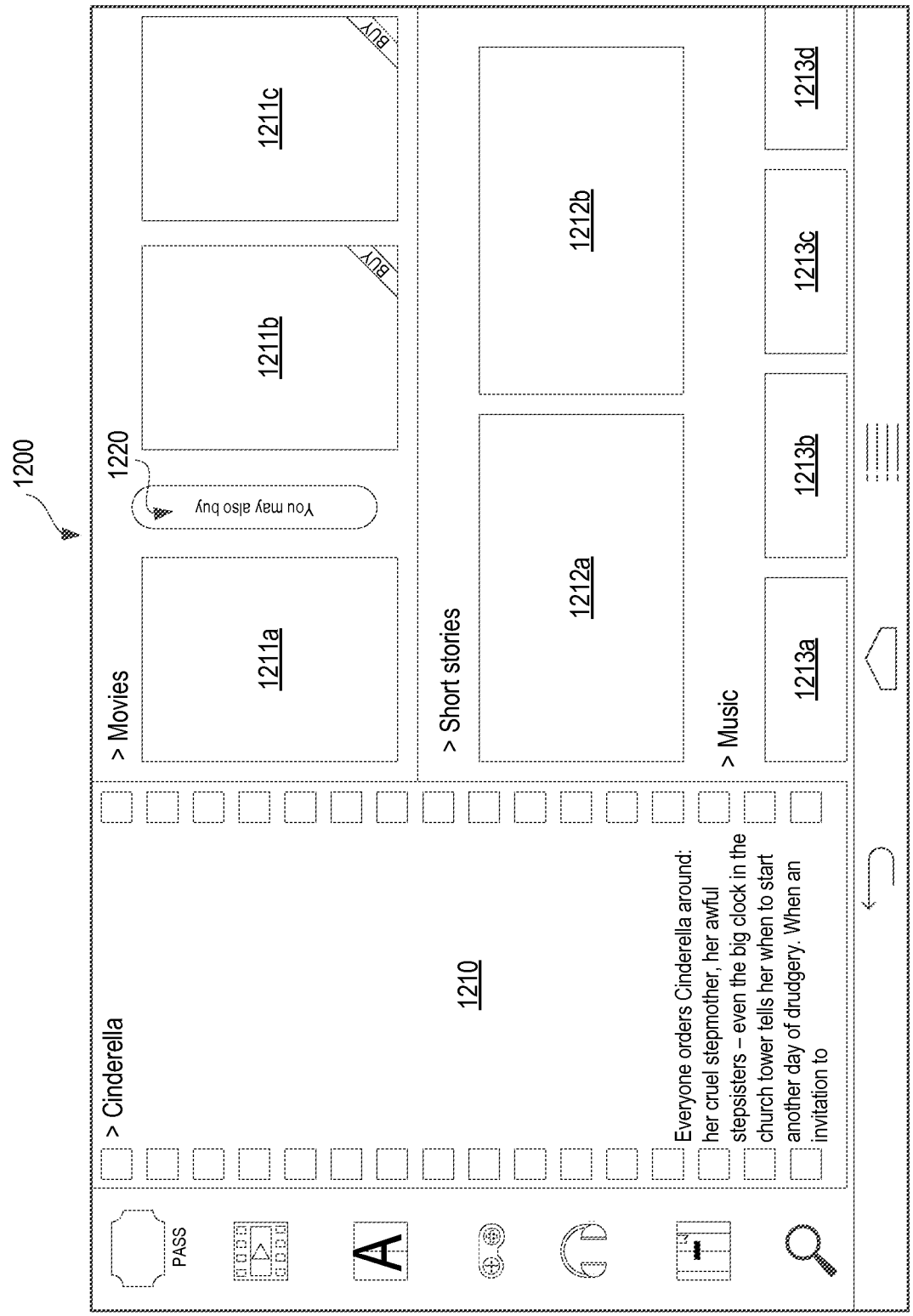
FIG. 12 illustrates an exemplary user interface of a character page, according to one embodiment.

FIG. 12 illustrates an exemplary user interface of a character page, according to one embodiment. In response to a discovery user's selection of a content item corresponding to a character, for example, Cinderella, a user interface 1200 is presented to the user. The user interface 1200 includes a banner advertisement 1210 having a description of the selected content item, Cinderella. The user interface 1200 further includes a mixed curation of content, including movies 1211a-1211c, short stories 1212a-1212b, and music 1213a-1213d. It is understood that other mixed content types and a greater or lesser number of content types may be provided without deviating from the scope of the present disclosure. The user interface 1200 includes a purchase option icon 1220 for purchasing content items that are available for purchase.

Figure 13:
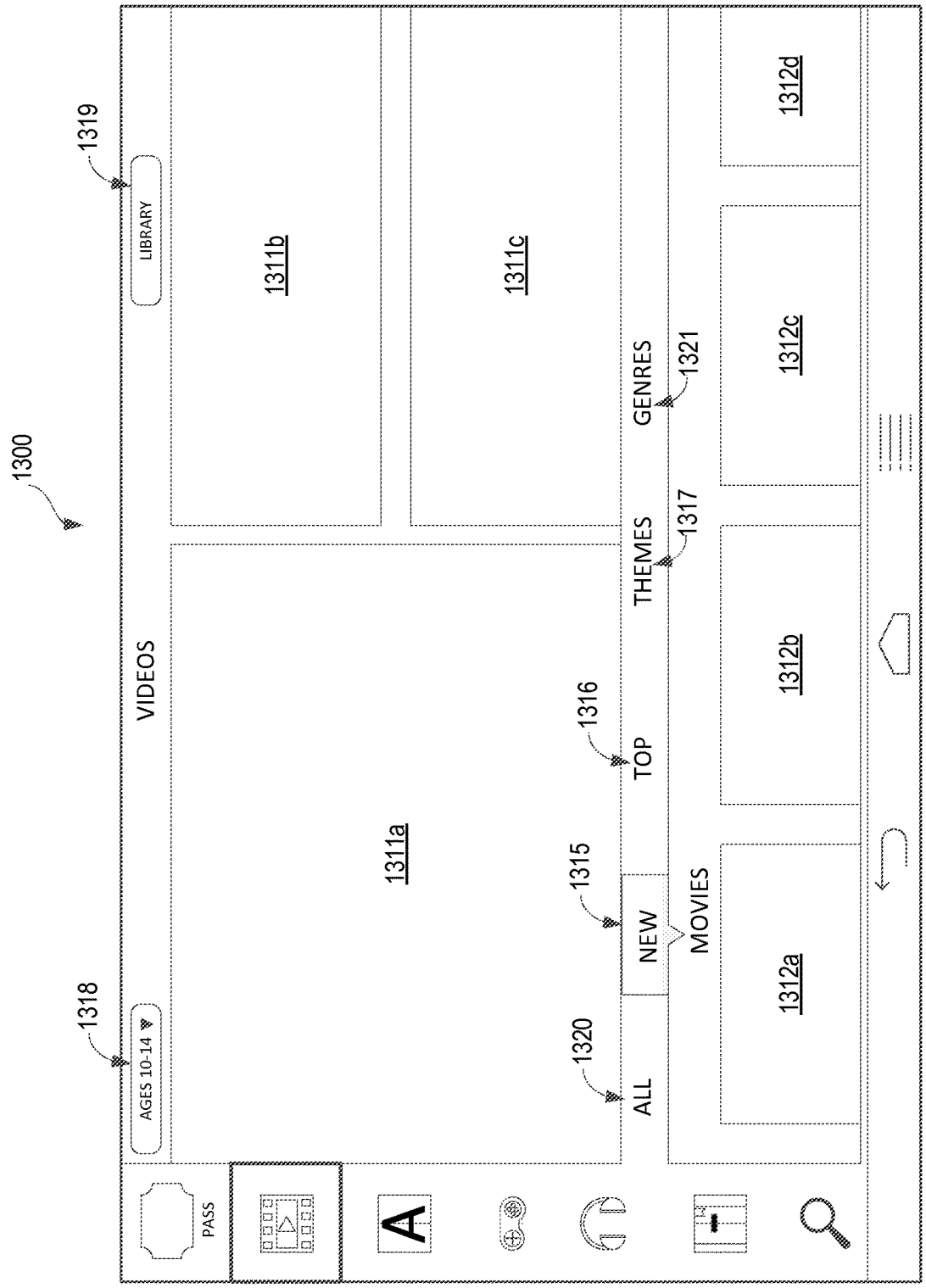
FIG. 13 illustrates an exemplary user interface of a video content type, according to one embodiment.

FIG. 13 illustrates an exemplary user interface of a video content type, according to one embodiment. A user interface 1300 is displayed when a discovery user selects a video content type. The user interface 1300 includes an age button 1318 that allows the discovery user to configure an age range (e.g., all ages, ages 5-10, and ages 10-14) and display content items selected for the age range. The user interface 1300 includes a library button 1319 for displaying content items within a curation library. The user interface 1300 includes banners 1311a-1311c that feature desired content items for the video content type.

The user interface 1300 further includes other curated content items 1312a-1312d as grouped by an all tab 1320, a new tab 1315 (shown by default), a top tab 1316, a themes tab 1317, and a genre tab 1321. The all tab 1320 includes all the content items in the curation library that may be arranged in any order. The new tab 1315 includes the latest content in the curation library. The top tab 1316 includes the most popular content items in the curation library. The themes tab 1317 includes curated content items sorted by themes. For example, the themes include "Dinosaurs and reptiles", "Cars & things that go", "Space & science", "Sports", "Dogs & cats", "Wild friends", "Food", "Nature", "Heroes", and "Around the world". The genre tab includes curated content items sorted by a genre type. For example, the genres include "Action & adventure", "Fantasy", and "Silly stuff". While FIG. 13 only displays an exemplary user interface for a video content type, it is understood that similar user interfaces may be displayed for other content types, including, but not limited to, an application, an electronic book, a game, and music.

Figure 14:
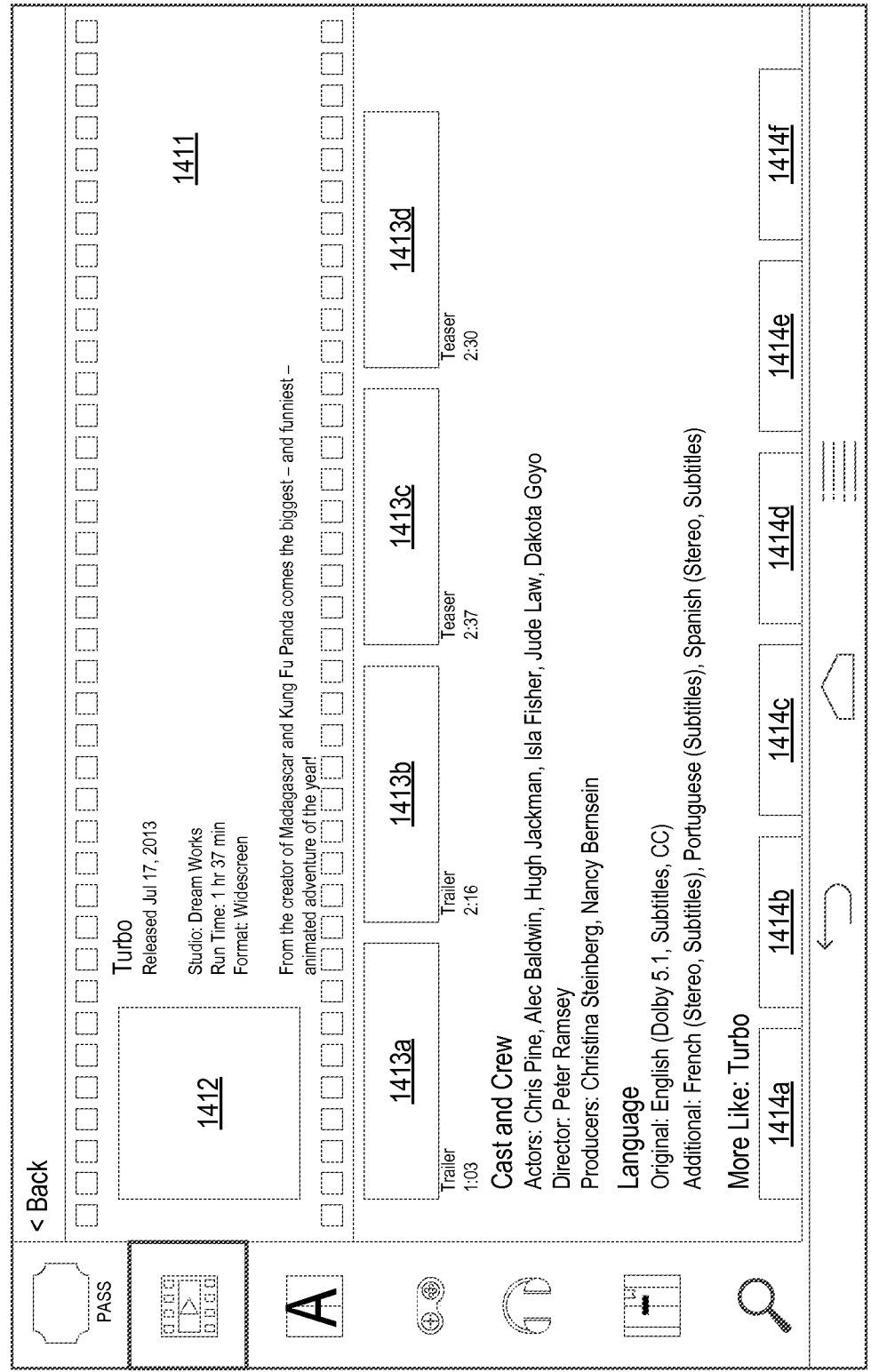
FIG. 14 illustrates an exemplary user interface of a video page, according to one embodiment.

FIG. 14 illustrates an exemplary user interface of a video page, according to one embodiment. A user interface 1400 is displayed when a discovery user selects a banner for a movie. The user interface 1400 includes an artwork 1412 and a description 1411 of the selected movie. The user interface 1400 includes trailers and teasers 1413a-1413d, and information regarding the details of the selected movie, for example, cast and crew, and language. The trailer and teasers 1413 include a selectable link for playing either on the user interface 1400 or using a separate media player. The user interface 1400 further includes associative content items 1414a-1414f that are related (and curated) to the selected movie.

Figure 15:
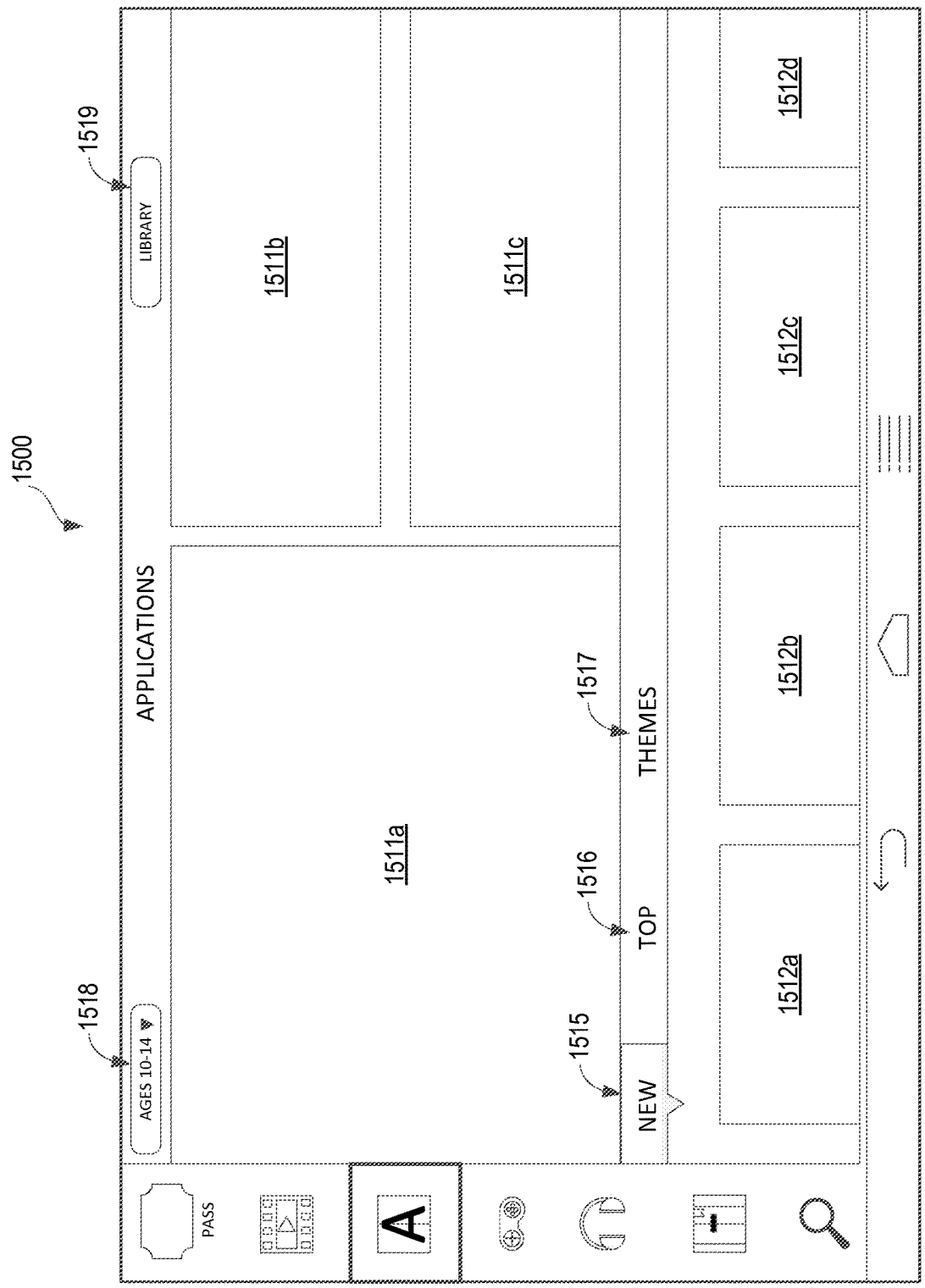
FIG. 15 illustrates an exemplary user interface of an application content type, according to one embodiment.

FIG. 15 illustrates an exemplary user interface of an application content type, according to one embodiment. A user interface 1500 is displayed when a discovery user selects an application content type. The user interface 1500 includes an age button 1518 that allows the discovery user to configure an age range (e.g., all ages, ages 5-10, and ages 10-14) and display content items selected for the age range. The user interface 1500 includes a library button 1519 for displaying content items within a curation library. The user interface 1500 includes banners 1511a-1511c that feature desired applications to the discovery user. The user interface 1500 includes other curated content items 1512a-1512d as grouped by a new tab 1515 (shown by default), a top tab 1516 and a themes tab 1517. The new tab 1515 includes the latest content in the curation library. The top tab 1516 includes the most popular content items in the curation library. The themes tab 1517 includes curated content items sorted by themes. The content items 1512a-1512d may or may not be of the same content type of the desired applications featured in the banners 1511a-1511c on the major slots of the application user interface 1500.

Figure 16:
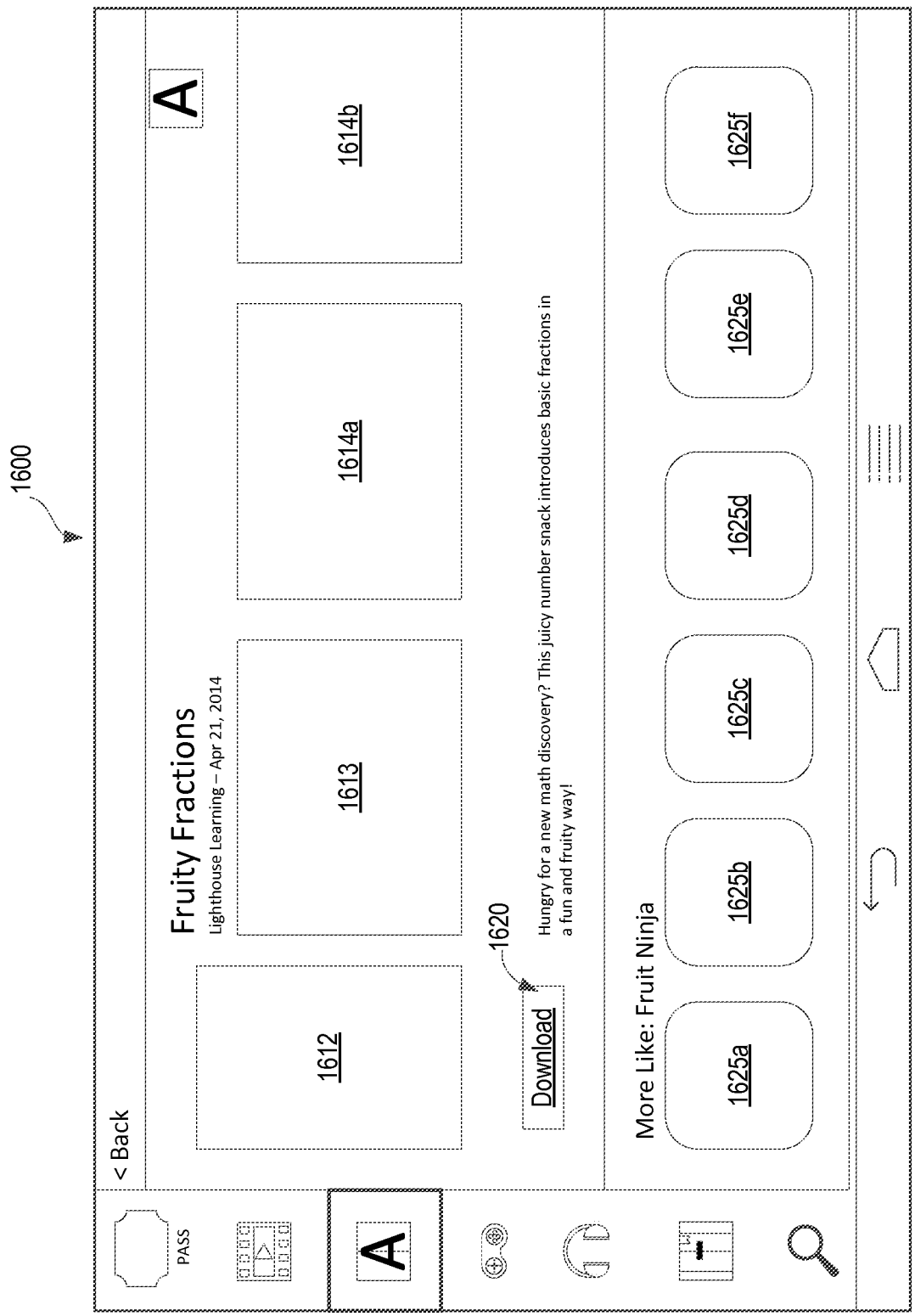
FIG. 16 illustrates an exemplary user interface of an application page, according to one embodiment.

FIG. 16 illustrates an exemplary user interface of an application page, according to one embodiment. A user interface 1600 is displayed when a discovery user selects a banner for an application. The user interface 1600 includes an artwork 1612 and a selectable banner 1613 of the selected application "Fruity Fractions". Other applications 1614a-1614b of a similar type of metadata (e.g., a content type and a genre) are also shown next to the selectable banner 1613. The user may select a download button 1620 to download the selected application. The user interface 1600 includes content items 1625a-1625f that are related to the selected application, such as a movie, music, a trailer, and an electronic book. Similar user interfaces may be presented to the discovery user for other types of content including games, music, and electronic books in response to the discovery user's selection of the corresponding content type widgets.

Figure 17:
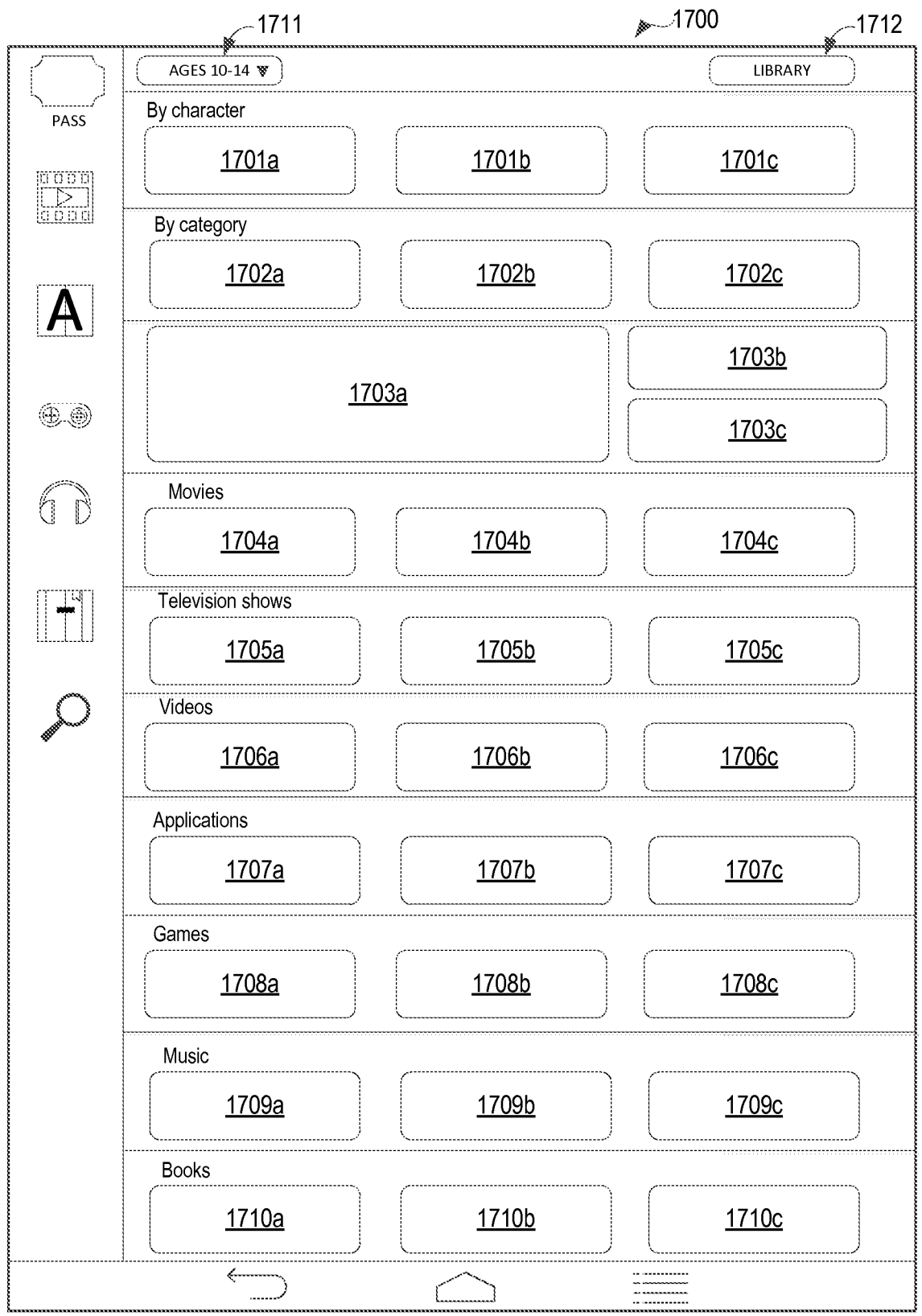
FIG. 17 illustrates another exemplary user interface for providing curated content items, according to one embodiment.

FIG. 17 illustrates another exemplary user interface for providing curated content items, according to one embodiment. A user interface 1700 is displayed when a discovery user launches an application for providing curated content items. The user interface 1700 includes an age button 1711 that allows the discovery user to configure an age range (e.g., all ages, ages 5-10, and ages 10-14) and display content items selected for the age range. The user interface 1700 includes a library button 1712 for displaying content items within a curation library.

The user interface 1700 includes content items that are sorted by characters 1701a-1701c. The user interface 1700 includes content items that are sorted by categories 1702a-1702c. The categories 1702a-1702c include, but are not limited to, recently watched content items, a partner page, a genre, and a theme. The user interface 1700 includes banners 1703a-1703c that feature desired content items, for example, an upcoming content item, a popular content item, and a content item provided by the present content curation system. The user interface 1700 further includes content items sorted by different content types, such as movie content items 1704a-1704c, television show content items 1705a-1705c, video content items 1706a-1706c, application content items 1707a-1707c, game content items 1708a-1708c, music content items 1709a-1709c, and electronic book content items 1710a-1710c. It is understood that the user interface 1700 may include any number of content types arranged in any order without deviating from the scope of the present disclosure.

Figure 18:
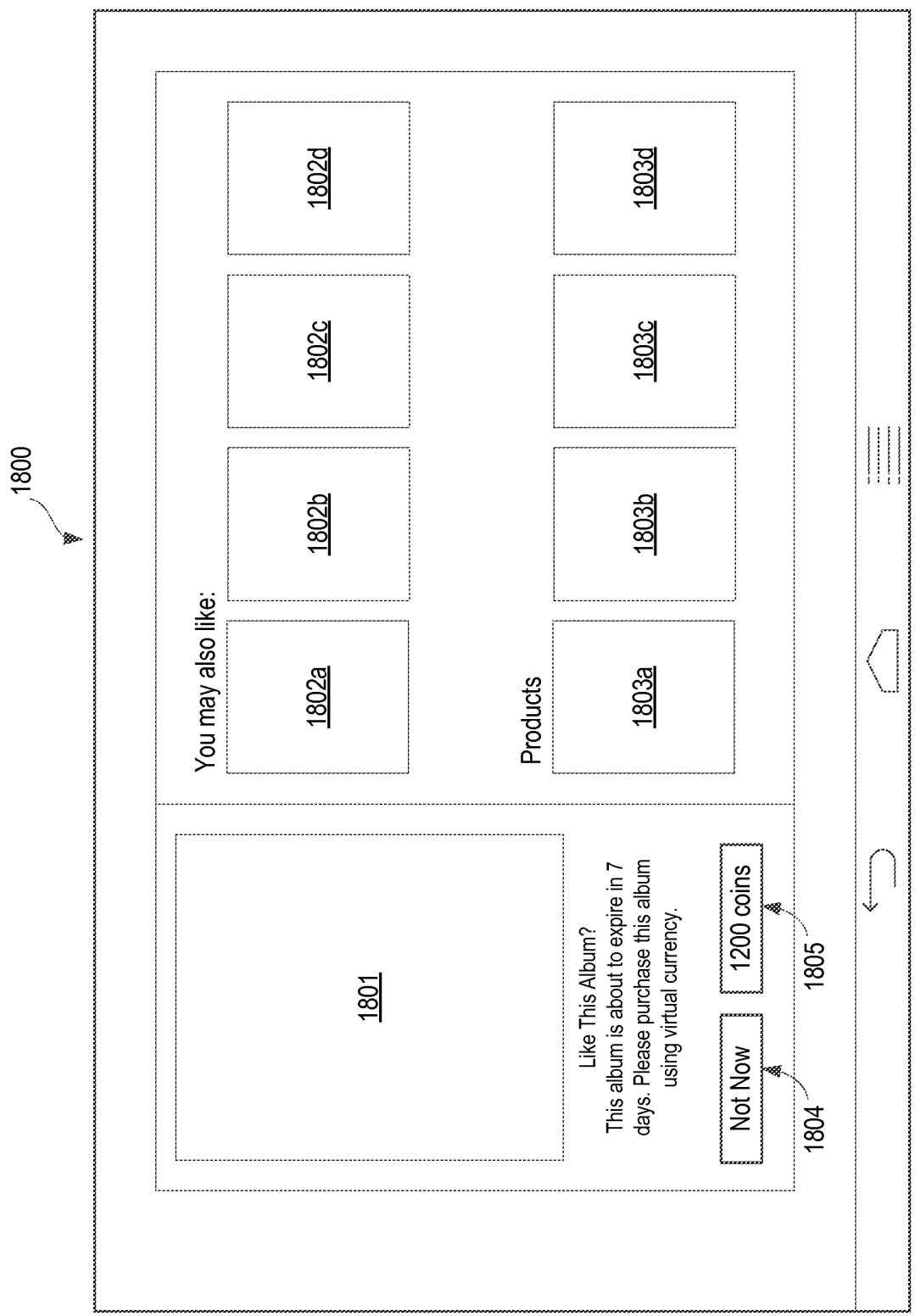
FIG. 18 illustrates an exemplary user interface of an electronic commerce page, according to one embodiment.

FIG. 18 illustrates an exemplary user interface of an electronic commerce page, according to one embodiment. A user interface 1800 is displayed when a discovery user accesses or consumes a content item 1801, for example, a music album. The content item 1801 may include artwork such as an image, a description, and a title. The user interface 1800 may inform the discovery user of an upcoming expiration of the content item and request the discovery user to purchase the music album using virtual currency or other forms of currency. The discovery user may choose not to purchase the content item by selecting a cancel button 1804 or purchase the content item by selecting a purchase button 1805. The purchase button 1805 may further display a price of the content item for sale.

The user interface 1800 recommends other virtual items such as curated content items 1802a-1802d for purchase or consumption by the discovery user. The curated content items 1802a-1802d may have one or more of a similar topic as the content item 1801, a divergent topic from the content item 1801, and an associated topic with the content item 1801. The user interface 1800 further recommends physical items 1803a-1803d for purchase by the discovery user. The physical items 1803a-1803d may be associated with the content item, for example, a headphone physical item for listening to a music album content item. When the discovery user selects one of the physical items 1803a-1803d, the user interface 1800 provides a description of the one of the physical items 1803a-1803d such as a written description and an image. The user interface 1800 allows the discovery user to purchase the one of the physical items 1803a-1803d using virtual currency or other forms of currency.

Curation Integration with Broadcasted Media Content Application

According to one embodiment, the present content curation system provides integration with an external application that displays broadcasted media content items on a user device from a media content provider server, for example, DIRECTTV TV ANYWHERE™ application. The present content curation system curates content items for a discovery user using videos and video rights from a mobile virtual network operator (MVNO) such as a media content provider server for example, DIRECTTV®, COMCAST®, AT&T® and VERIZON® by communicating with the media content provider server using a MVNO digital rights management (DRM) protocol. According to one embodiment, the present content curation system provides a set of curated content items for a desired time period based on access rights provided by the media content provider server.

Figure 19:
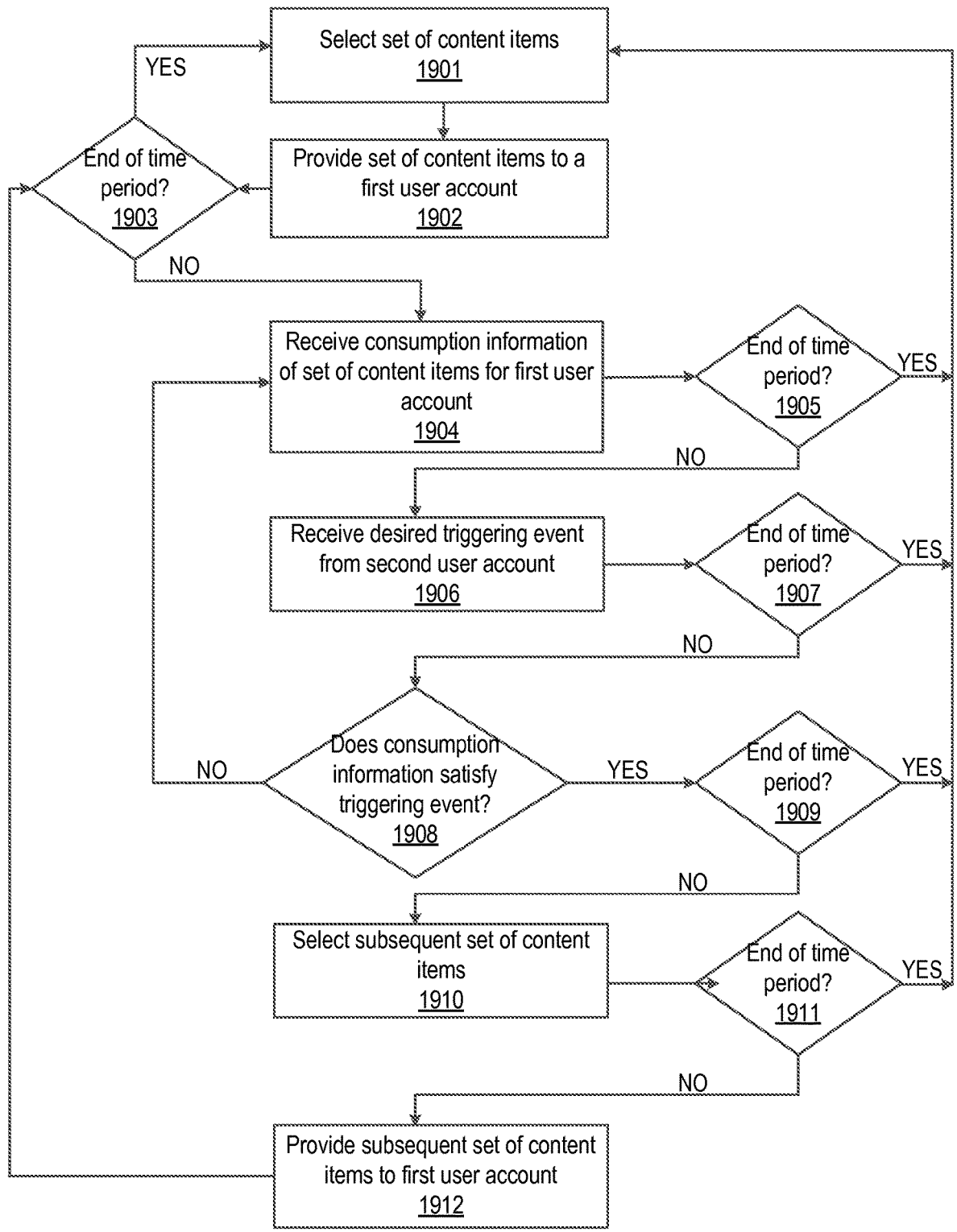
FIG. 19 illustrates an exemplary flow chart for providing curated content items, according to one embodiment.

FIG. 19 illustrates an exemplary flow chart for providing curated content items, according to one embodiment. The present content curation system selects a set of content items from a plurality of available content items provided by a content service provider server (at 1901). The present content curation system may select the set of content items based on various factors, including, but not limited to, a season, an event, a character, a relation, a geographical location, a desired content item provided by the content provider server, and a promotional campaign provided by the content provider server. According to one embodiment, the present content curation system selects the set of content items from available content items provided by a plurality of content service provider servers having different types of content. The present content curation system provides the set of content items to a first user account on a first user portal of a user device (at 1902).

The present content curation system determines whether a current limited curation time period has ended (at 1903). If the present content curation system detects the current limited curation time period has ended (at 1903), the present content curation system returns to selecting a set of content items (at 1901). If the present content curation system does not detect that the current limited curation time period has ended (at 1903), the present content curation system receives consumption information of the set of content items for the first user account (at 1904). The consumption information includes, but is not limited to, a completed task associated with a content item of the set of content items, a cumulative consumption time of the content item, a number of times of consumption of the content item, a frequency of consumption of the content item, and a number of content items of the set of content items that are consumed.

The present content curation system determines whether the current limited curation time period has ended (at 1905). If the present content curation system detects that the current limited curation time period has ended (at 1905), the present content curation system returns to selecting a set of content items (at 1901). If the present content curation system does not detect that the current limited curation time period has ended (at 1905), the present content curation system receives a desired triggering event defined by a second user account via a second user portal on the user device (at 1906). In one embodiment, the second user account defines the desired triggering event via a second user portal on another user device. The desired triggering event includes, but is not limited to, a completed task associated with a content item of the set of content items, a threshold consumption time of the content item, a threshold number of times of consumption of the content item, a threshold frequency of consumption of the content item, and a threshold number of content items that are consumed.

The present content curation system determines whether the current limited curation time period has ended (at 1907). If the present content curation system detects that the current limited curation time period has ended (at 1907), the present content curation system returns to selecting a set of content items (at 1901). If the present content curation system does not detect that the current limited curation time period has ended (at 1907), the present content curation system checks whether the consumption information satisfies a desired triggering event (at 1908). The desired triggering event includes, but is not limited to, a completed task associated with a content item of the set of content items, a threshold consumption time of the content item, a threshold number of times of consumption of the content item, a threshold frequency of consumption of the content item, and a threshold number of content items of the set of content items that are consumed.

If the consumption information satisfies the desired triggering event (at 1908), the present content curation system further determines the current limited curation time period has ended (at 1909). If the consumption information does not satisfy the desired triggering event (at 1908), the present content curation system returns to receiving consumption information (at 1904). If the present content curation system detects that the current limited curation time period has ended (at 1909), the present content curation system returns to selecting a set of content items (at 1901). If the present content curation system does not detect that the current limited curation time period has ended (at 1909), the present content curation system selects a subsequent set of content items from the plurality of available content items based on the consumption information satisfying the desired triggering event (at 1910). For example, if the desired triggering event is a maximum number of times to access a game as 5 times, the present content curation system omits the game from the subsequent set of content items if the discovery user has accessed the game at least 5 times.

The present content curation system determines whether the current limited curation time period has ended (at 1911). If the present content curation system detects that the current limited curation time period has ended (at 1911), the present content curation system returns to selecting a set of content items (at 1901). If the present content curation system does not detect that the current limited curation time period has ended (at 1911), the present content curation system provides the subsequent set of content items to the first user account via the first user portal on the user device (at 1912). The present curation process dynamically provides and refreshes content items that are specifically tailored to each discovery user.

Figure 20:
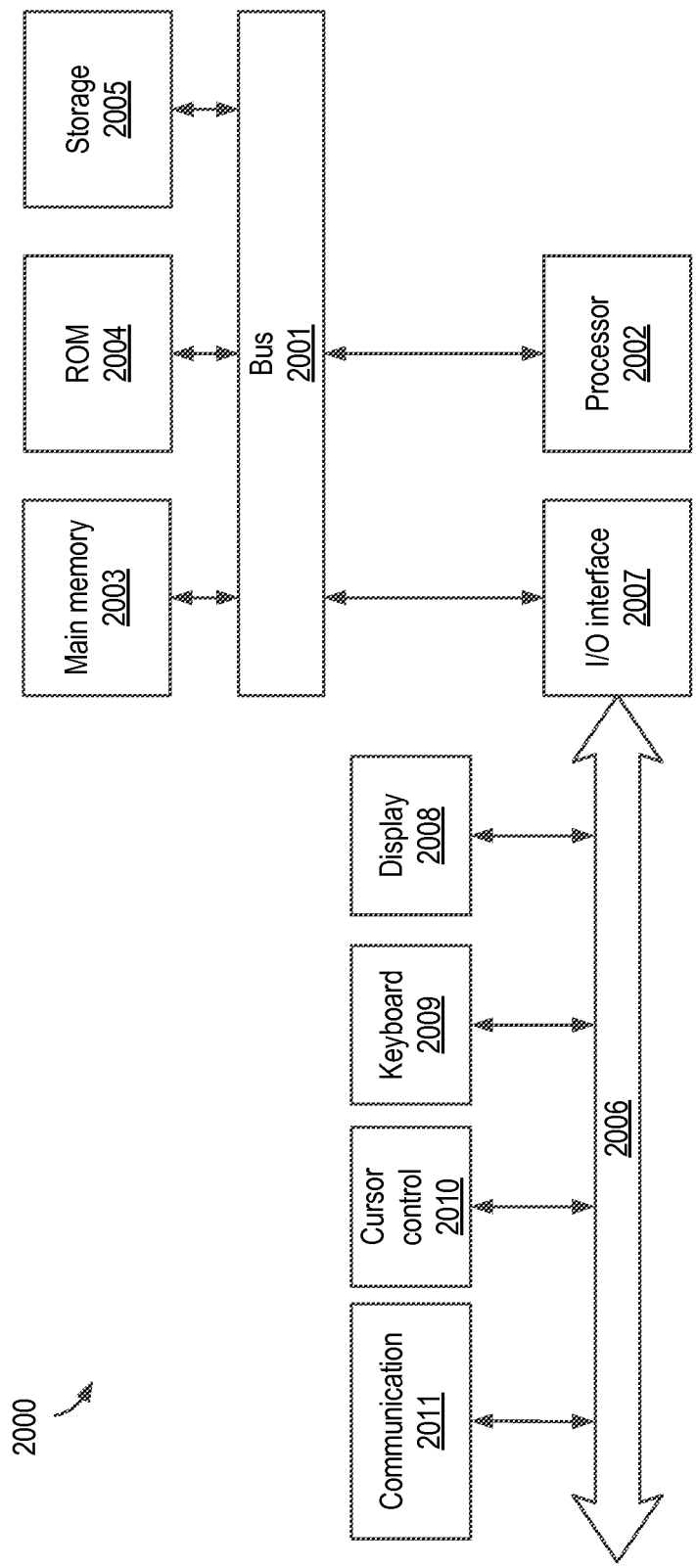
FIG. 20 illustrates an exemplary computer architecture that may be used for the present system, according to one embodiment.

FIG. 20 illustrates an exemplary computer architecture that may be used for the present system, according to one embodiment. The exemplary computer architecture may be used for implementing one or more components described in the present disclosure including, but not limited to, the present content curation system. One embodiment of architecture 2000 includes a system bus 2001 for communicating information, and a processor 2002 coupled to bus 2001 for processing information. Architecture 2000 further includes a random access memory (RAM) or other dynamic storage device 2003 (referred to herein as main memory), coupled to bus 2001 for storing information and instructions to be executed by processor 2002. Main memory 2003 also may be used for storing temporary variables or other intermediate information during execution of instructions by processor 2002. Architecture 2000 may also include a read only memory (ROM) and/or other static storage device 2004 coupled to bus 2001 for storing static information and instructions used by processor 2002.

A data storage device 2005 such as a magnetic disk or optical disc and its corresponding drive may also be coupled to architecture 2000 for storing information and instructions. Architecture 2000 can also be coupled to a second I/O bus 2006 via an I/O interface 2007. A plurality of I/O devices may be coupled to I/O bus 2006, including a display device 2008, an input device (e.g., an alphanumeric input device 2009 and/or a cursor control device 2010).

The communication device 2011 allows for access to other computers (e.g., servers or clients) via a network. The communication device 2011 may include one or more modems, network interface cards, wireless network interfaces or other interface devices, such as those used for coupling to Ethernet, token ring, or other types of networks.

The above example embodiments have been described hereinabove to illustrate various embodiments of implementing a system and method for online bidding. Various modifications and departures from the disclosed example embodiments will occur to those having ordinary skill in the art. The subject matter that is intended to be within the scope of the disclosure is set forth in the following claims.

We claim:

1. A method, comprising:
   selecting a first set of content items from a plurality of available content items provided by a plurality of content provider servers;
   providing the first set of content items to a second user account included in a subscriber account, wherein the subscriber account includes a first user account and the second user account;
   providing a curation interface to the second user account on a second user portal that displays on a user device, wherein the curation interface displays information on the first set of content items;
   receiving a curation instruction that is configured by the second user account via the curation interface;
   selecting a second set of content items from the first set of content items based upon the curation instruction; and
   providing the second set of content items to the first user account on a first user portal that displays on the user device.

2. The method of claim 1, wherein the information on the first set of content items includes a discovery path including content items from the first set of content items selected by the second user account of the subscription account.

3. The method of claim 1, further comprising providing the curation instruction to a plurality of subscriber accounts upon authorization by the second user account of the subscription account.

4. The method of claim 1, further comprising receiving consumption information for the first user account regarding the second set of content items from the user device.

5. The method of claim 4, further comprising providing the consumption information for the first user account to a plurality of subscriber accounts.

6. The method of claim 4, further comprising compiling a playlist of content items from the second set of content items based on the consumption information for the first user account regarding the second set of content items.

7. The method of claim 6, wherein the playlist is configured by the first user account using the first user portal that displays on the user device.

8. The method of claim 7, further comprising providing the playlist to a plurality of subscriber accounts upon authorization by the first user account.

9. The method of claim 4, further comprising providing the consumption information for the first user account to the plurality of content provider servers.

10. The method of claim 9, further comprising providing payment to the plurality of content provider servers based on the consumption information.

11. The method of claim 1, further comprising:
associating the subscriber account with a subscription service mode that is selected by the second user account via the second user portal; and
selecting the first set of content items from the plurality of available content items provided by the plurality of content provider servers based on the subscription service mode.

12. The method of claim 1, further comprising recommending one or more of a physical item and a virtual item associated with a content item of the first set of content items for purchase by the first user account on the user device, wherein the virtual item includes a movie, a video, an audio file, an electronic book, and an application.

13. A system, comprising:
a first user portal that displays on a user device, wherein the first user portal provides access to a first user account of a subscriber account;
a second user portal that displays on the user device, wherein the second user portal provides access to a second user account of the subscriber account;
a content curation analytics engine that selects a first set of content items from a plurality of available content items provided by a plurality of content provider servers,
provides the first set of content items to the second user account,
provides a curation interface to the second user account on the second user portal, wherein the curation interface displays information on the first set of content items,
receive a curation instruction that is configured by the second user account via the curation interface,
select a second set of content items from the first set of content items based upon the curation instruction, and
provide the second set of content items to the first user account on a first user portal.

14. The system of claim 13, wherein the content curation analytics engine provides the curation instruction to a plurality of subscriber accounts upon authorization by the second user account of the subscription account.

15. The system of claim 13, further comprising a user tracking engine that receives consumption information for the first user account regarding the second set of content items from the user device.

16. The system of claim 15, wherein the content curation analytics engine provides the consumption information for the first user account to a plurality of subscriber accounts.

17. The system of claim 15, wherein the content curation analytics engine compiles a playlist of content items from the second set of content items based on the consumption information for the first user account regarding the second set of content items.

18. The system of claim 15, wherein the content curation analytics engine provides the consumption information for the first user account to the plurality of content provider servers.

19. The system of claim 18, wherein the content curation analytics engine provides payment to the plurality of content provider servers based on the consumption information.

20. The system of claim 13, wherein the content curation analytics engine associates the subscriber account with a subscription service mode that is selected by the second user account via the second user portal, and
selects the first set of content items from the plurality of available content items provided by the plurality of content provider servers based on the subscription service mode.

21. The system of claim 13, wherein the content curation analytics engine recommends one or more of a physical item and a virtual item associated with a content item of the first set of content items for purchase by the first user account on the user device, wherein the virtual item includes a movie, a video, an audio file, an electronic book, and an application.

22. The method of claim 1, wherein the curation instruction includes an instruction that restricts access to one or more content items of the first set of content items in the first user account.

23. The method of claim 22, wherein selecting a second set of content items from the first set of content items based upon the curation instruction includes excluding the one or more content items from the second set of content items.

24. The method of claim 23, wherein selecting a second set of content items from the first set of content items based upon the curation instruction includes excluding the one or more content items from the second set of content items when (1) total consumption time of the one or more content items in the first user account is more than a threshold total consumption time for the one or more content items, or (2) the one or more content items have been consumed in the first user account more than a threshold total number of times for the one or more content items.

* * * * *